United States Patent
Yuan et al.

(10) Patent No.: US 10,230,464 B2
(45) Date of Patent: Mar. 12, 2019

(54) SYSTEM, METHOD, AND DEVICE FOR MEASURING OPTICAL FIBER CHANNEL LOSS IN PHOTONIC COMMUNICATION

(71) Applicant: Alibaba Group Holding Limited, George Town, Grand Cayman (KY)

(72) Inventors: Peng Yuan, Hangzhou (CN); Shaojie Liu, Hangzhou (CN); Zhiqiang Wang, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 75 days.

(21) Appl. No.: 15/335,648

(22) Filed: Oct. 27, 2016

(65) Prior Publication Data

US 2017/0126316 A1 May 4, 2017

(30) Foreign Application Priority Data

Oct. 29, 2015 (CN) .......................... 2015 1 0724984

(51) Int. Cl.
*H04B 10/079* (2013.01)
*H04J 14/02* (2006.01)
*H04L 9/08* (2006.01)

(52) U.S. Cl.
CPC . *H04B 10/07955* (2013.01); *H04B 10/07957* (2013.01); *H04J 14/0227* (2013.01); *H04L 9/0852* (2013.01)

(58) Field of Classification Search
CPC ........ H04B 10/07955; H04B 10/07957; H04L 43/065; H04L 9/0852; H04J 14/0227
See application file for complete search history.

(56) References Cited

U.S. PATENT DOCUMENTS

| | | |
|---|---|---|
| 5,305,412 A | 4/1994 | Paoli |
| 6,016,219 A | 1/2000 | Fatehi |
| 6,175,560 B1 | 1/2001 | Bhagalia et al. |
| 6,266,168 B1 | 7/2001 | Denkin |
| 6,341,032 B1 | 1/2002 | Fukashiro |
| 6,433,922 B1 | 8/2002 | Ghera |
| 6,650,468 B1 | 11/2003 | Bryant |
| 6,754,420 B2 | 6/2004 | Tsuritani |
| 6,952,395 B1 | 10/2005 | Manoharan |
| 7,024,110 B2 | 4/2006 | Jasti |

(Continued)

FOREIGN PATENT DOCUMENTS

WO WO-2015183364 A2 * 12/2015 ........... H04B 10/071

*Primary Examiner* — Leslie C Pascal
(74) *Attorney, Agent, or Firm* — Shun Yao; Park, Vaughan, Fleming & Dowler LLP

(57) ABSTRACT

One embodiment provides a system for measuring optical fiber channel loss in photonic communication. During operation, a first multiplexing device receives a first signal which is a photonic signal and a second signal which is a reference light signal transmitted by a first measuring device. In response, the first multiplexing device couples the first signal with the second signal, and transmits the coupled signal via an optical fiber channel to a second multiplexing device. The second multiplexing device separates the coupled signal into a separated first signal and a separated second signal, and transmits the separated second signal to a second measuring device. The system obtains indices related to a degree of loss of the optical fiber channel based on the separated second signal.

20 Claims, 15 Drawing Sheets

(56) References Cited

U.S. PATENT DOCUMENTS

| | | |
|---|---|---|
| 7,123,404 B1 | 10/2006 | Mori |
| 7,136,583 B2 | 11/2006 | Oberg |
| 7,231,146 B2 | 6/2007 | Arecco |
| 7,400,829 B2 | 7/2008 | Watanabe |
| 7,756,422 B2 * | 7/2010 | Sakamoto ............... H04B 10/07 398/177 |
| 8,822,895 B2 | 9/2014 | Abedin |
| 9,917,672 B2 | 3/2018 | Jensen |
| 2001/0021045 A1 | 9/2001 | Tervonen |
| 2002/0154353 A1 | 10/2002 | Heath |
| 2004/0037555 A1 | 2/2004 | Evangelides |
| 2004/0090662 A1 | 5/2004 | Bang |
| 2004/0114925 A1 | 6/2004 | Berthold |
| 2004/0146305 A1 | 7/2004 | Neubelt |
| 2004/0175187 A1 | 9/2004 | Eiselt |
| 2004/0208506 A1 | 10/2004 | Kinoshita |
| 2004/0213577 A1 | 10/2004 | Sugahara |
| 2005/0110980 A1 * | 5/2005 | Maehara ............... H04B 10/071 356/73.1 |
| 2006/0087975 A1 | 4/2006 | Zheng |
| 2006/0115266 A1 | 6/2006 | Levi |
| 2006/0176545 A1 | 8/2006 | Nakamura |
| 2009/0028562 A1 | 1/2009 | Gianordoli |
| 2009/0103915 A1 | 4/2009 | Aprile |
| 2009/0226174 A1 | 9/2009 | Csupor |
| 2009/0245786 A1 * | 10/2009 | Sakamoto .......... H04B 10/0775 398/28 |
| 2009/0262790 A1 | 10/2009 | Molotchko |
| 2010/0091355 A1 | 4/2010 | Ota |
| 2010/0284687 A1 | 11/2010 | Tanzi |
| 2010/0290780 A1 | 11/2010 | Teipen |
| 2010/0296808 A1 | 11/2010 | Hinderthuer |
| 2011/0116786 A1 | 5/2011 | Wellbrock |
| 2011/0274435 A1 | 11/2011 | Fini |
| 2012/0020672 A1 | 1/2012 | Aguren |
| 2012/0033966 A1 | 2/2012 | Rosenbluth |
| 2012/0106971 A1 | 5/2012 | Sugaya |
| 2012/0294604 A1 | 11/2012 | Roberts |
| 2013/0189856 A1 | 7/2013 | Ko |
| 2013/0223484 A1 | 8/2013 | Tang |
| 2013/0243438 A1 | 9/2013 | Tang |
| 2013/0272694 A1 | 10/2013 | Sandstrom |
| 2013/0343757 A1 | 12/2013 | Wigley |
| 2014/0013402 A1 | 1/2014 | Bugenhagen |
| 2014/0105592 A1 | 4/2014 | Kataria |
| 2014/0186021 A1 | 7/2014 | Striegler |
| 2014/0248059 A1 | 9/2014 | Tang |
| 2014/0258772 A1 | 9/2014 | Kataria |
| 2015/0296279 A1 | 10/2015 | Bouda |
| 2016/0233959 A1 | 8/2016 | Murshid |
| 2016/0277101 A1 * | 9/2016 | Jiang ................. H04B 10/0775 |
| 2017/0353242 A1 | 12/2017 | Mansouri Rad |

* cited by examiner

SYSTEM, METHOD, AND DEVICE FOR MEASURING OPTICAL FIBER CHANNEL LOSS IN PHOTONIC COMMUNICATION

RELATED APPLICATION

Under 35 U.S.C. 119, this application claims the benefit and right of priority of Chinese Patent Application No. 201510724984.2, filed 29 Oct. 2015.

BACKGROUND

Field

This disclosure is generally related to the field of quantum communication. More specifically, this disclosure is related to a system, method, and device for measuring the optical fiber channel loss in photonic communication.

Related Art

Quantum communication is an information transmission technology for transmitting quantum states from one place to another. Three types of quantum communication currently exist: quantum teleportation; quantum entanglement swapping; and quantum encryption transmission. Currently, quantum encryption transmission—which integrates quantum key distribution with a classic encryption technique—is the only type of quantum communication proven to be secure. Quantum encryption transmission is also the only type of quantum communication that has both practical application and potential for industrialization. Quantum key distribution enables two parties to produce a shared random secret key known only to the parties, which can then be used to encrypt and decrypt message.

Photonic communication is based on the transmission of photons, and can be sensitive to loss on the optical fiber channel. As an example, take quantum key distribution based on the BB84 quantum cryptography protocol, where a sender and a receiver agree on a quantum key. The sender can encode the photon under a polarized state to generate a random sequence, and transmit the encoded photon to the receiver via the optical fiber channel. The receiver can receive and measure the photon based on randomly selected measurement bases. The sender and the receiver can screen the original quantum keys by comparing the measurement bases, which allows both the sender and the receiver to estimate the bit error rate of the transmission process. If the bit error rate is above a predetermined threshold, the sender and the receiver can abandon the key distribution process. If the bit error rate is below the predetermined threshold, the sender and the receiver can determine a shared quantum key. Note that the bit error rate of the transmission process may increase with increased loss on the optical fiber channel. As a result, the rate of code formed to create the quantum key can decrease rapidly, and the quantum key distribution operation may fail to meet the requirements of data encryption and decryption on quantum keys.

Thus, ensuring stability in photonic communication generally requires a high quality optical fiber channel. There is a need to conduct real-time monitoring for the quality of the optical fiber channel and also to optimize the optical attenuation control of the optical fiber channel. However, the characteristics of photonic communication create challenges to meet these needs.

In conventional optical fiber transmission, intense light beams are emitted to the optical fibers. This allows optical fiber losses to be measured directly by calculating the difference between the power transmitted by a sender and the power received by a receiver. However, in photonic communication, isolated photons are transmitted to the optical fibers. This does not allow conventional power measurement based on standard equipment, and also does not provide real-time measurement of the optical fiber channel loss in photonic communication.

Furthermore, during photonic communication, if intense light beans are emitted directly on the optical fibers to measure the optical attenuation, the photon is destroyed in the intense light beans. For example, if the transmission of isolated photons (or "light quantum") and the emission of intense light beams occur at the same time, a single photon containing key information may be destroyed in the intense light beams. This can result in the receiver being unable to measure the photon, and may also result in a failure of the entire photonic communication.

Thus, there is a need for real-time measurement of the degree of optical fiber channel loss in photonic communication, while avoiding affecting the standard photonic communication and ensuring the correct photonic transmission.

SUMMARY

One embodiment provides a system for efficiently measuring optical fiber channel loss in photonic communication. During operation, a first multiplexing device receives a first signal which is a photonic signal and a second signal which is a reference signal transmitted by a first measuring device. In response, the first multiplexing device couples the first signal with the second signal, and transmits the coupled signal via an optical fiber channel to a second multiplexing device. The second multiplexing device separates the coupled signal into a separated first signal and a separated second signal, and transmits the separated second signal to a second measuring device. The system obtains indices related to a degree of loss of the optical fiber channel based on the separated second signal, thereby facilitating real-time measurement of the degree of loss of the optical fiber channel without affecting communication based on the photonic signal.

In some embodiments, the first signal is transmitted by a first communication device. The first communication device and a second communication device comprise equipment for photonic communication. The first multiplexing device is coupled to the first communication device and the first measuring device via the optical fiber channel, and the second multiplexing device is coupled to the second communication device and the second measuring device via the optical fiber channel. The system receives, by the second measuring device, the separated second signal from the second multiplexing device. The system transmits, by the second multiplexing device, the separated first signal to the second communication device.

In some embodiments, the first and second multiplexing devices transmit the second signal through mutual isolation from a coupled photonic signal based on one or more of: a dimension or unit of time; and a wavelength.

In some embodiments, the first measuring device comprises a first transceiver with a transmitting component and a receiving component, and the second measuring device comprises a second transceiver with a transmitting component and a receiving component.

In some embodiments, the system measures, by the first transceiver, a difference in power between the second signal and the separated second signal. The system can also or alternatively perform a bi-directional measurement of reference light signals. The system measures, by the first transceiver, a difference in power between the second signal and the separated second signal. The second multiplexing device receives a third signal which is a reference signal from the transmitting component of the second transceiver and a fourth signal which is a photonic signal from the second communication device. In response, the second multiplexing device couples the third signal with the fourth signal to obtain a newly coupled signal, and transmits the newly coupled signal via the optical fiber channel to the first multiplexing device. The first multiplexing device separates the newly coupled signal into a separated third signal and a separated fourth signal. The first multiplexing device transmits the separated third signal to the receiving component of the first transceiver, and transmits the separated fourth signal to the first communication device. The system obtains, by the first transceiver, the indices related to the degree of loss of the optical fiber channel based on the separated third signal by measuring, by the first transceiver, a difference in power between the third signal and the separated third signal.

In some embodiments, the first measuring device comprises a first optical loss measurement device, and the first optical loss measurement device transmits the second signal to the first multiplexing device. The system receives, by the first optical loss measurement device, a backscattered light of the second signal. The system obtains, by the first optical loss measurement device, the indices related to the degree of loss of the optical fiber channel by measuring, by the first optical loss measurement device, the backscattered light of the second signal.

In some embodiments, the second measuring device comprises a second optical loss measurement device. The system performs a bi-directional measurement of backscattered light. The second optical loss measurement device transmits a third signal which is a reference signal from the second optical loss measurement device. The second optical loss measurement device receives backscattered light of the third signal, and obtains the indices related to the degree of loss of the optical fiber channel by measuring the backscattered light of the third signal.

In some embodiments, a monitor server is coupled to the first and second measuring devices via an electrical channel. In response to determining that the first measuring device transmits the second signal at a pre-determined constant power, the monitor server obtains the indices by measuring a difference in power between the second signal and the separated second signal. In response to determining that the first measuring device does not transmit the second signal at a pre-determined constant power, the system performs the following operations: the monitor server receives from the second measuring device an automatic report which includes the indices obtained by the second measuring device; or the monitor server invokes an application programming interface to determine the obtained indices. The monitor server generates statistical data based on the obtained indices, and displays the obtained indices and the generated statistical data to an administrative user of the system via a display screen or other display device.

In some embodiments, a monitor server is coupled via an electrical channel to an interconnecting device, and the interconnecting device is coupled via the electrical channel to the first and second communication devices, the first and second multiplexing devices, and the first and second measuring devices. The monitor server sends a first instruction to suspend photonic communication to the first and second communication devices. The monitor server sends, to the first and second multiplexing devices via the interconnecting device, a second instruction to turn on an optical link between the first and second measuring devices. The second measuring device obtains the indices related to the degree of loss of the optical fiber channel based on the separated second signal. The monitor server obtains, via the interconnecting device, the indices from the second measuring device. The monitor server sends, to the first and second multiplexing devices via the interconnecting device, a third instruction to turn off the optical link between the first and second measuring devices. The monitor server sends a fourth instruction to resume photonic communication to the first and second communication devices.

BRIEF DESCRIPTION OF THE FIGURES

In the figures, like reference numerals refer to the same figure elements.

DETAILED DESCRIPTION

Figure 1:
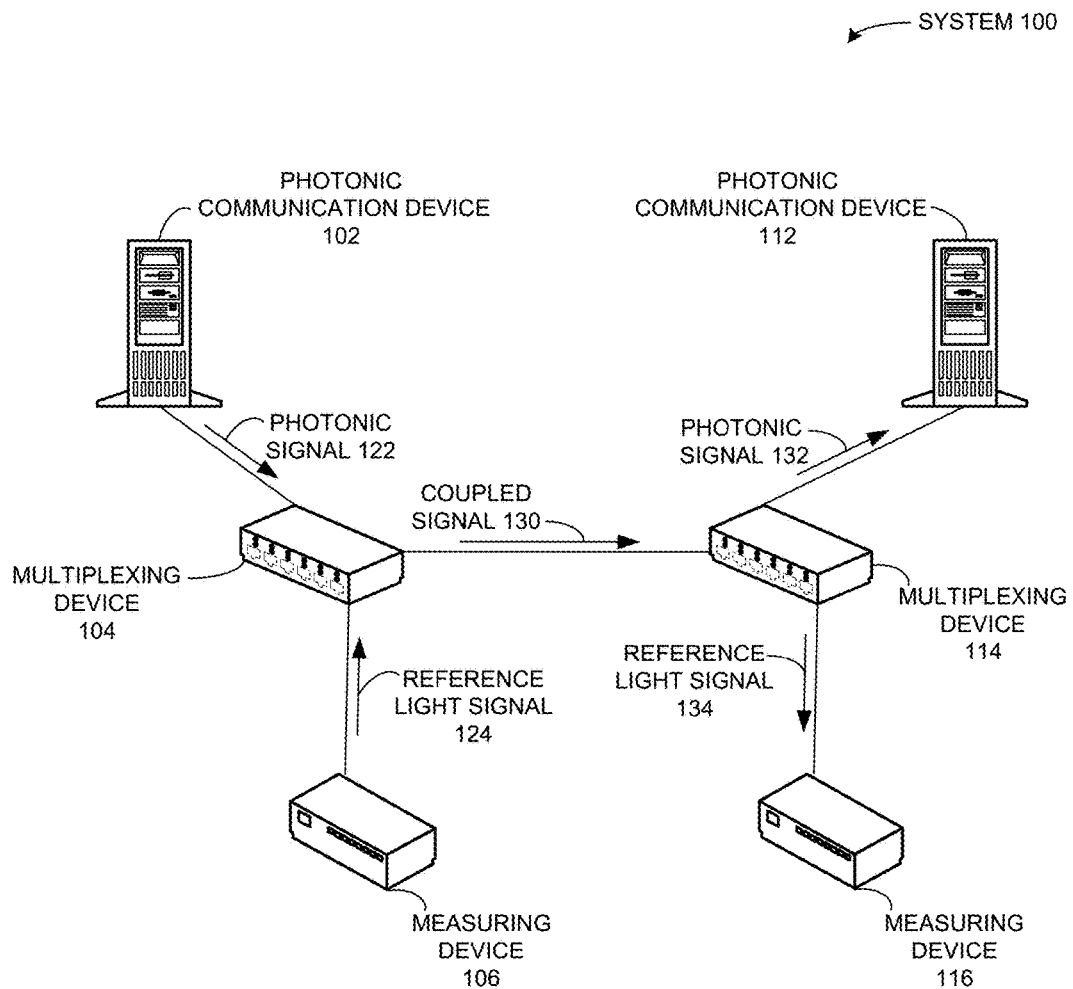
FIG. 1 illustrates an exemplary system that facilitates measuring optical fiber channel loss in photonic communication, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of achieving real-time measurement of the degree of loss of the optical fiber channel in photonic communication without affecting the photonic communication by introducing a reference light signal. The reference light signal is a light signal measured using conventional light measurement equipment, such as a light power meter. The reference light signal is sometimes referred to an intense light signal or an intense light beam to distinguish it from the photonic signal. The system includes at least the following entities: a pair of communication devices coupled via an optical fiber channel to, respectively, a pair of multiplexing devices, which are in turn coupled via the optical fiber channel, respectively, to a pair of measuring devices. The communication devices can include any equipment capable of handling photonic communication; the multiplexing devices can include any equipment capable of handling multiple signals which include photonic communication; and the measuring devices can include transmitting components, receiving components, transceiver devices, optical loss measurement devices, and any other device capable of generating or measuring a reference light signal.

During operation, a first measuring device transmits a reference light signal, which is coupled by a first multiplexing device with a photonic signal transmitted by a first communication device. The first multiplexing device can then transmit the coupled signal to the second multiplexing device. The coupled signal is separated by the second multiplexing device into a separated reference light signal which is transmitted to the second measuring device. The second measuring device can then obtain the indices related to the degree of loss of the optical fiber channel.

More generally, the system provides a transmission channel for the photonic signal and the reference light signal, such that during the photonic communication, the measuring devices can measure the coupled reference light signal at any time as needed, which allows the system to measure and obtain the indices. Thus, embodiments of the present invention achieve real-time measurement of the loss of the optical fiber channel in photonic communication, while maintaining a correct photonic communication without affecting the photonic communication. The system can provide a more accurate and powerful basis for improving the operation of photonic communication, including an increase in the coding rate, e.g., of a quantum key during a quantum key distribution process.

Thus, the present system provides improvements to photonic communication, where the improvements are fundamentally technological. Embodiments of the present invention provide a technological solution (e.g., measuring the degree of fiber channel loss in photonic communication without affecting the actual photonic communication by introducing a reference signal light) to the technological problem of efficient, secure, and effective photonic communication over an optical fiber channel.

Exemplary Embodiment of System that Measures the Loss of Photonic Communication Over an Optical Fiber Channel FIG. 1 illustrates an exemplary system 100 that facilitates measuring optical fiber channel loss in photonic communication, in accordance with an embodiment of the present application. System 100 can include a pair of photonic communication devices 102 and 112, which are each connected, respectively, via an optical fiber channel to a pair of multiplexing devices 104 and 114. Multiplexing devices 104 and 114 are connected to each other via the optical fiber channel, and are also each connected, respectively, via the optical fiber channel to a pair of measuring devices 106 and 116.

Photonic communication devices 102 and 112 can include any equipment which can communicate via photonic communication, e.g., by transmitting a photon or a light quantum. One example of photonic communication is the quantum key distribution process. Multiplexing device 104 and 114 can include any equipment which connects any pair of photonic communication devices. Measuring device 106 can include at least a transmitting component, and measuring device 116 can include at least a receiving component. The optical fiber channel to be measured can be an end-to-end optical fiber link between photonic communication devices, or may be one section of optical fiber in the end-to-end link.

As discussed above, the degree of loss of the optical fiber channel during photonic communication cannot be measured by conventional measurement equipment. Embodiments of the present invention solve this problem by introducing a reference light signal, which can be measured using conventional light measurement equipment (e.g., measuring devices 106 and 116).

During operation, communication device 102 can send a photonic signal 122 to multiplexing device 104, and measuring device 106 can send a reference light signal 124 to multiplexing device 104. Multiplexing device 104 can couple photonic signal 122 and reference light signal 124, and transmit a coupled signal 130 through mutual isolation via the optical fiber channel to multiplexing device 114.

Multiplexing device 114 can receive coupled light signal 130 and separate coupled light signal 130 into photonic signal 132 and reference light signal 134. Multiplexing device 114 can transmit the separated photonic signal 132 to communication device 112, and can also transmit the separated reference light signal 134 to measuring device 116. The system can measure separated reference light signal 134 to obtain the indices related to the degree of optical fiber channel loss in photonic communication.

Multiplexing devices 104 and 114 can include either time division multiplexing equipment or wavelength division multiplexing equipment. That is, multiplexing devices 104 and 114 can transmit a reference light signal through mutual isolation from a coupled photonic signal based on a dimension or unit of time, or on a wavelength. Specifically, when multiplexing devices 104 and 114 include time division multiplexing equipment, multiplexing device 104 couples and transmits photonic signal 122 from communication device 102 and reference light signal 124 from measuring device 106 based on different time quanta (or time windows), while multiplexing device 114 receives and separates coupled signal 130 and measures separated reference light signal 134 based on different time quanta.

Similarly, when multiplexing devices 104 and 114 include wavelength division multiplexing equipment, multiplexing device 104 couples and transmits photonic signal 122 from communication device 102 and reference light signal 124 from measuring device 106 based on different wavelengths, while multiplexing device 114 receives and separates coupled signal 130 and measures separated reference light signal 134 based on different wavelengths.

Multiplexing devices 104 and 114 can include other types of multiplexing equipment for use in photonic communication not disclosed herein, as long as one multiplexing device can couple and transmit the reference light signal through mutual isolation into the optical fiber channel to be measured, and a second multiplexing device can receive and separate the coupled signal for measurement without any mutual effects.

Obtaining the Indices for the Degree of Loss Over an Optical Fiber Channel

As depicted in FIG. 1, measuring device 116 can measure separated reference light signal 134, and obtain the indices related to the degree of loss of the optical fiber channel. An example of a related index is the power of the separated reference light signal (e.g., reference light signal 134). While obtaining the related indices, the system can obtain the degree of loss of the optical fiber channel, and use the obtained indices to determine the quality of the optical fiber link. The system can evaluate the quality of the optical fiber link, and locate and address possible problems present in the optical fiber link (e.g., bending, aging, and overheating). The system can subsequently use these findings to optimize the quality of the optical fiber link.

Furthermore, the system can evaluate the degree of loss of the optical fiber channel with reference to measurements obtained based on the reference light signal and the separated reference light signal (i.e., reference light signal 124 and separated reference light signal 134). Accordingly, the system can adjust relevant parameters of the photonic communication (i.e., photonic signal 122 and separated photonic signal 132). For example, the system can adjust relevant parameters during a quantum key distribution operation in order to avoid a decrease in the coding rate to create the quantum key.

Obtaining the indices may involve different measurement methods. Two measurement methods include: 1) measurement of the reference light signal after the reference light signal is transmitted from one end to another end of the optical fiber; and 2) measurement of the backscattered light of the reference light signal. The first measurement method is described herein in relation to FIGS. 1 and 2, and the second measurement method is described herein in relation to FIGS. 3 and 4.

Obtaining the Indices: Measuring the Power Difference

Returning to FIG. 1, measuring device 116 can receive and measure separated reference light signal 134, and obtain the indices related to the degree of loss over the optical fiber channel. The related indices can include the power of the separated reference light signal received by the measuring device (i.e., reference light signal 134 as received by measuring device 116). For example, measuring device 116 can measure the light intensity of reference light signal 134 by using an internal light power meter module. Measuring device 106 can transmit reference light signal 124 at a predetermined constant power. Measuring device 116 can thus calculate the difference between the power of the transmitted reference light signal (i.e., reference light signal 124) and the power of the separated and received reference light signal (i.e., reference light signal 134). This power difference can indicate the attenuation of the transmission of the reference light signal in the optical fiber. This power difference can also reflect the degree of loss over the optical fiber channel. In general, the greater the power difference, the greater the degree of loss over the optical fiber channel.

Obtaining the Indices: Bi-Directionally Measuring the Power Difference

Figure 2:
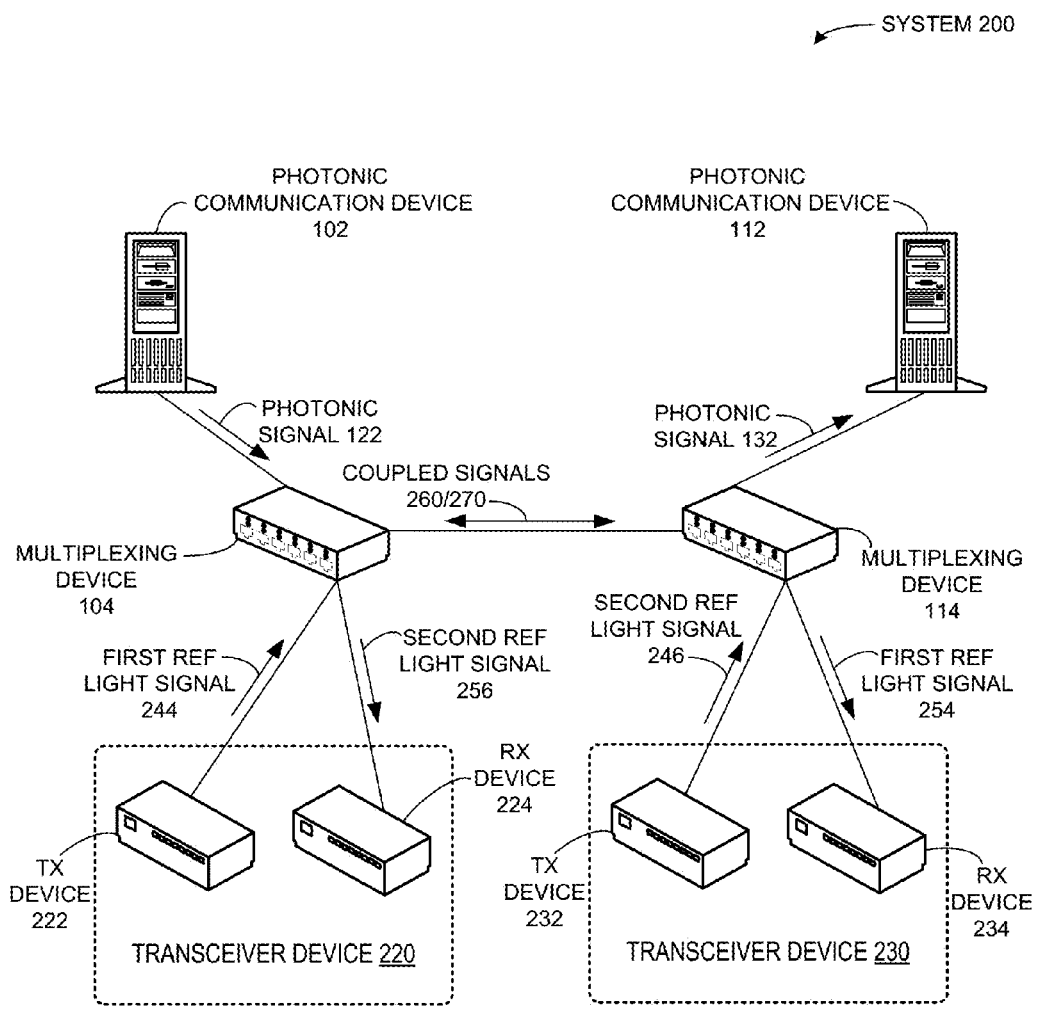
FIG. 2 illustrates an exemplary system that facilitates measuring optical fiber channel loss in photonic communication, including bi-directional measurement of reference light signals by transceivers, in accordance with an embodiment of the present application.

The system can obtain the indices by performing a bi-directional measurement of the power difference. FIG. 2 illustrates an exemplary system 200 that facilitates measuring optical fiber channel loss in photonic communication, including bi-directional measurement of reference light signals by transceivers, in accordance with an embodiment of the present application. System 200 includes (instead of measuring devices 106 and 116 as in FIG. 1) transceiver devices 220 and 230. Transceiver device 220 can include a transmitting component or device 222 and a receiving component or device 224, and transceiver device 230 can include a transmitting component or device 232 and a receiving component or device 234. Transceiver device 220 can transmit (via transmitting device 222) a first reference light signal 244, and transceiver device 230 can receive (via receiving device 234) and measure the first reference light signal 254 which is separated from coupled light signal 260 and transmitted by multiplexing device 114. Transceiver device 230 can subsequently calculate the difference between the power of the transmitted reference light signal (i.e., first reference light signal 244) and the power of the separated and received reference light signal (i.e., first reference light signal 254).

Similarly, transceiver device 230 can transmit (via transmitting device 232) a second reference light signal 246, and transceiver device 220 can receive (via receiving device 224) and measure the second reference light signal 256 which is separated from coupled light signal 270 and transmitted by multiplexing device 104. Transceiver device 220 can subsequently calculate the difference between the power of the transmitted reference light signal (i.e., second reference light signal 246) and the power of the separated and received reference light signal (i.e., second reference light signal 256).

Thus, system 200 illustrates how the reference light signal can be transmitted from both ends of the optical fiber channel without affecting the usual operation of quantum light communication. The system can obtain the indices related to the degree of loss of the optical fiber channel by bi-directionally measuring the power difference of the reference light signals, which can result in a more accurate measurement of the degree of loss.

Obtaining the Indices: Measuring the Backscattered Light of the Reference Light Signal When a multiplexing device couples the reference light signal for transmission and measurement, some scattered light and reflected light is returned through the optical fiber channel, e.g., as Rayleigh scattering. Furthermore, Fresnel reflection can occur due to characteristics of the optical fiber, such as bending and aging. This returned and reflected light signal is referred to as the "backscattered light" of the reference light signal. The system can obtain the indices related to the degree of loss over the optical fiber channel by measuring the backscattered light of the reference light signal.

In some embodiments, the system can use an optical loss measurement device, such as an optical time domain reflectometer ("OTDR"). An OTDR can be used to obtain the indices related to the degree of loss over the optical fiber channel. For example, an OTDR can measure the total link loss of the optical fiber by measuring the backscattered light of the reference light signal and combining the transmitted power of the reference light signal. An OTDR can obtain additional indices, including data relating to optical attenuation at different positions of the optical fiber to be measured. These additional indices can result in a more accurate measurement of the degree of loss.

Figure 3:
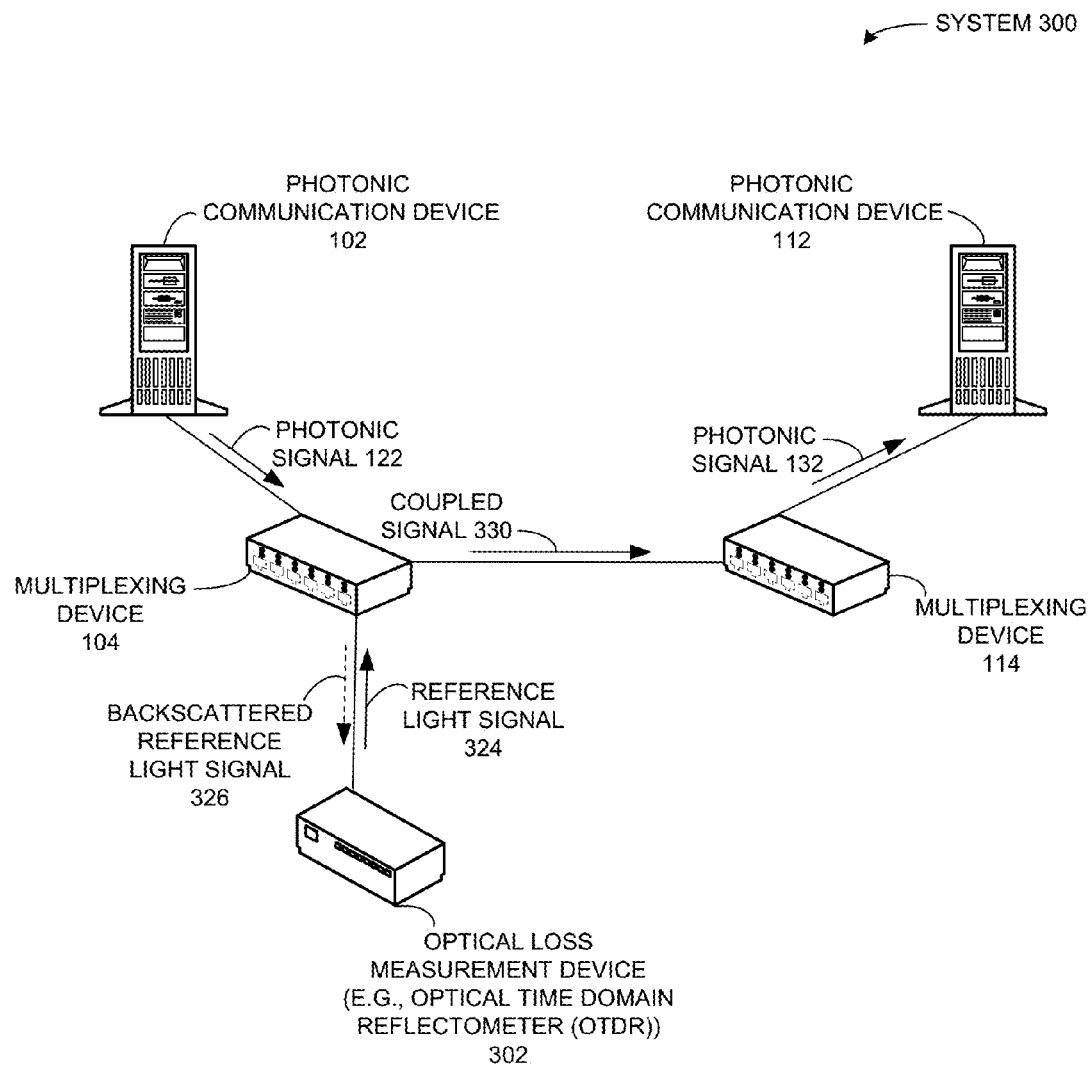
FIG. 3 illustrates an exemplary system that facilitates measuring optical fiber channel loss in photonic communication, including measurement of backscattered light of the reference light signal by an optical loss measurement device, in accordance with an embodiment of the present application.

FIG. 3 illustrates an exemplary system 300 that facilitates measuring optical fiber channel loss in photonic communication, including measurement of backscattered light of the reference light signal by an optical loss measurement device, in accordance with an embodiment of the present application. System 300 includes (instead of measuring devices 106 and 116 as in FIG. 1) an optical loss measurement device 302, which can be an OTDR. OTDR 302 can transmit a reference light signal 324 to multiplexing device 104. Multiplexing device 104 can couple photonic signal 122 and reference light signal 324, and transmit a coupled signal 330 through mutual isolation via the optical fiber channel to multiplexing device 114 within a predetermined period of time (e.g., a pre-set measurement period). In addition, multiplexing device 104 can simultaneously transmit to OTDR 302 a backscattered reference light signal 326 from multiplexing device 104, where backscattered reference light signal 326 is the backscattered light of reference light signal 324. Multiplexing device 114 can receive coupled light signal 330 and separate coupled light signal 330 into photonic signal 132 and transmit separated photonic signal 132 to communication device 112.

Figure 4:
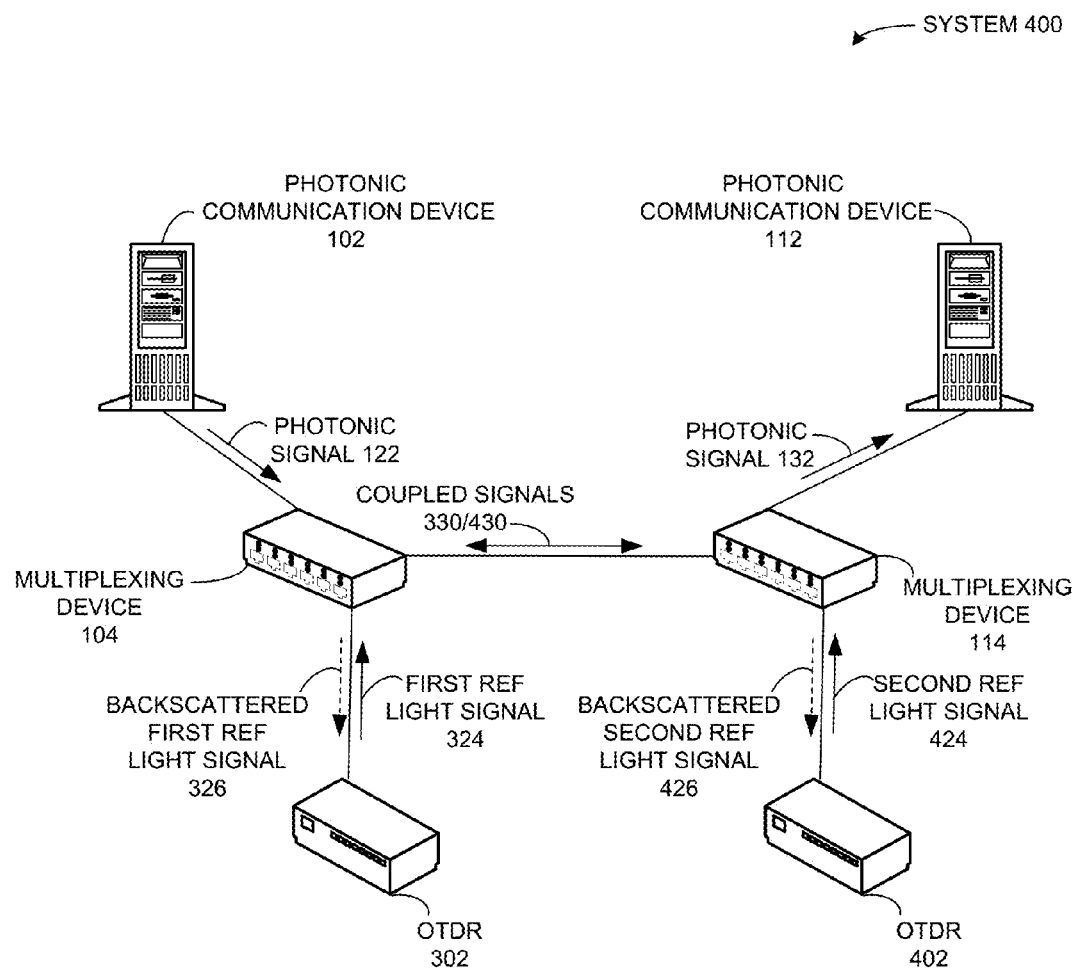
FIG. 4 illustrates an exemplary system that facilitates measuring optical fiber channel loss in photonic communication, including bi-directional measurement of backscattered light of reference light signals by optical loss measurement devices, in accordance with an embodiment of the present application.

Obtaining the Indices: Bi-Directionally Measuring the Backscattered Light of Reference Light Signals The system can also obtain the indices by performing a bi-directional measurement of the backscattered light of reference light signals. FIG. 4 illustrates an exemplary system 400 that facilitates measuring optical fiber channel loss in photonic communication, including bi-directional measurement of backscattered light of reference light signals by optical loss measurement devices, in accordance with an embodiment of the present application. System 400 is similar to system 300, and includes another OTDR 402, which is coupled to multiplexing device 114 via the optical fiber channel.

OTDR 402 can transmit a second reference light signal 424 to multiplexing device 114. Multiplexing device 114 can couple a photonic signal (not shown) from communication device 112 and second reference light signal 424, and transmit a coupled signal 430 through mutual isolation via the optical fiber channel to multiplexing device 104 within a pre-determined period of time. In addition, multiplexing device 114 can simultaneously transmit to OTDR 402 a backscattered second reference light signal 426 from multiplexing device 114, where backscattered reference light signal 426 is the backscattered light of reference light signal 424. Multiplexing device 104 can receive coupled light signal 430 and separate coupled light signal 430 into a photonic signal and transmit the separated photonic signal (not shown) to communication device 102.

Note that reference light signal 324 and backscattered reference light signal 326 of FIG. 3 are labeled in FIG. 4 as, respectively, "first reference light signal 324" and "backscattered first reference light signal 326" to distinguish between second reference light signal 424 and backscattered second reference light signal 426.

Thus, system 400 illustrates how the backscattered reference light signal can be measured by two different OTDRs operating at different ends of the optical fiber channel. This allows the system to obtain the indices related to the degree of loss over the optical fiber channel by bi-directionally measuring the backscattered light, which can result in a more accurate measurement of the degree of the optical fiber channel loss. This can be especially helpful when two or more fault points exist in the optical fiber to be measured, as bi-directional measurement of the backscattered light can help to identify the positions of the multiple fault points.

Monitor Server Obtains the Indices

In some embodiments, a monitor server can be connected to the measuring devices via a traditional channel, such as an electrical channel. The monitor server can thus obtain from the measuring devices the indices related to the degree of loss of the optical fiber channel. The monitor server can generate statistical data on the channel loss based on the obtained indices, and can also display both the obtained indices and the statistical data to an administrator of the system via a display screen or other display device.

Figure 5:
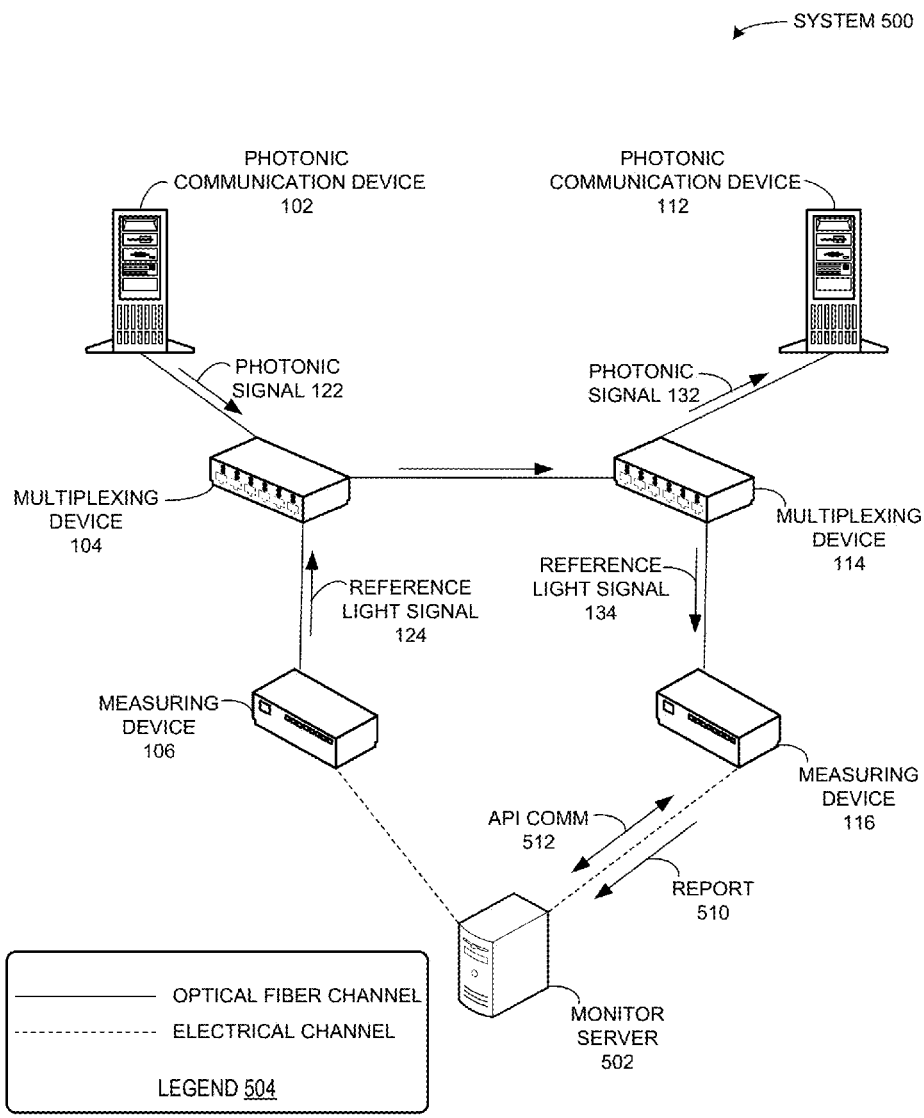
FIG. 5 illustrates an exemplary system that facilitates measuring optical fiber channel loss in photonic communication, including communication with a monitor server over an electrical channel, in accordance with an embodiment of the present application.

FIG. 5 illustrates an exemplary system 500 that facilitates measuring optical fiber channel loss in photonic communication, including communication with a monitor server over an electrical channel, in accordance with an embodiment of the present application. System 500 includes a monitor server 502 coupled to measuring devices 106 and 116 via an electrical channel. System 500 is depicted as similar to system 100 of FIG. 1, but can also include any of systems 200, 300, and 400 of, respectively, FIGS. 2, 3, and 4 (e.g., where monitor server 502 is connected to transceiver devices 220 and 230, or to OTDR 302, or to both OTDRs 302 and 402). Legend 504 indicates that a solid line denotes an optical fiber channel, while a dashed line denotes an electrical channel.

Monitor server 502 can obtain from measuring device 116, via the electrical channel, the indices related to the degree of loss of the optical fiber channel. If measuring device 106 transmits reference light signal 124 at a pre-determined constant level of power, monitor server 502 can calculate the difference between the power of the transmitted reference light signal (i.e., reference light signal 124) and the power of the separated and received reference light signal (i.e., reference light signal 134). If measuring device 106 does not transmit reference light signal 124 at a pre-determined constant level of power, monitor server 502 can obtain, from measuring device 106, an automatic report 510 which includes the indices obtained by measuring device 106, or, alternatively, monitor server 502 can invoke an application programming interface provided by measuring device 106 to determine the obtained indices (e.g., via API communication 512).

Upon obtaining the indices, monitor server 502 can generate statistical data based on the obtained indices, and can further display the obtained indices and the generated statistical data to an administrative user of the system via a display screen or other display device.

Monitor Server Obtains the Indices Via an Exchanger

The monitor server can also control system measurements by sending instructions via an interconnecting device. Thus, in addition to using pre-set parameters or a manual control method, the system can achieve automatic measurement, and can also control the measurement in a more flexible manner.

Figure 6:
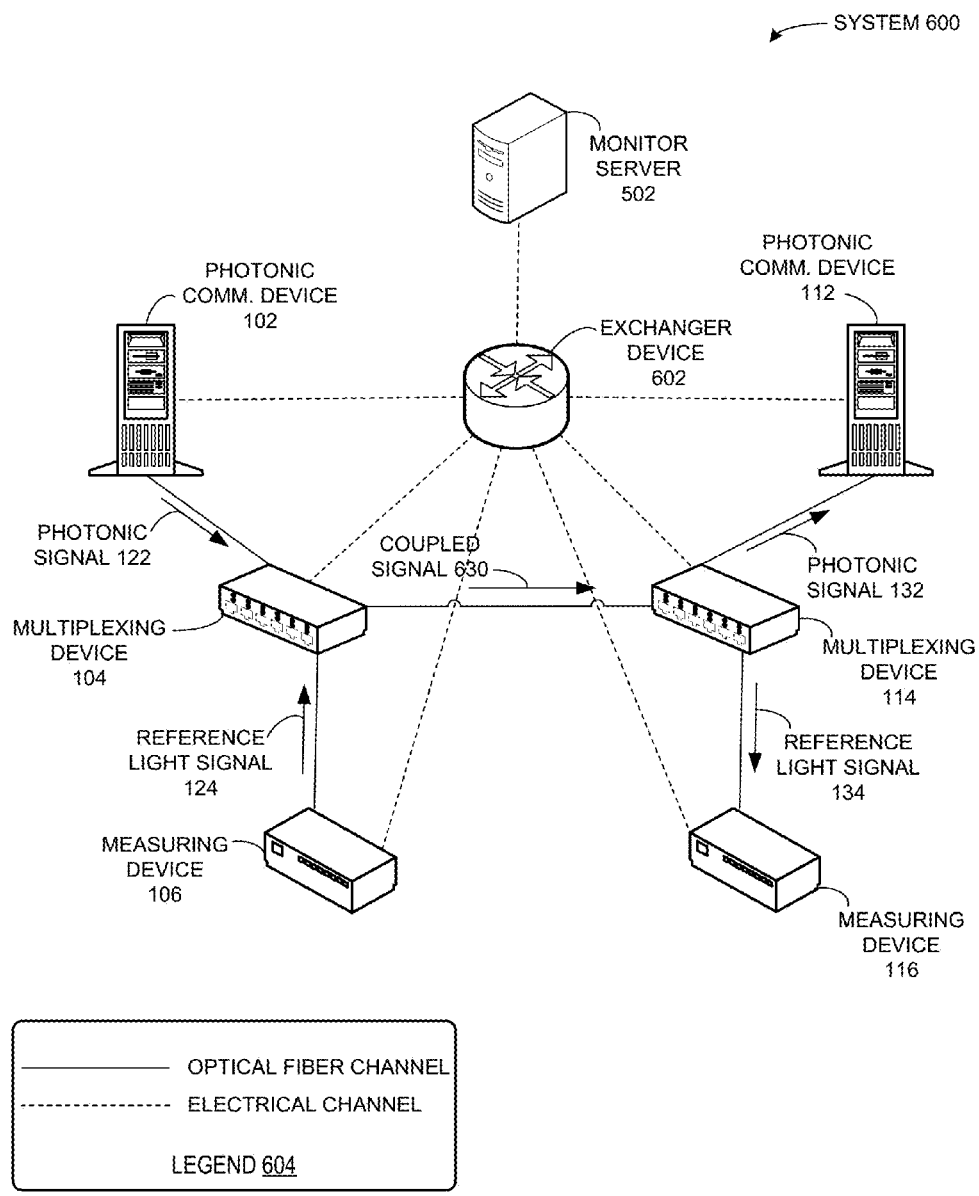
FIG. 6 illustrates an exemplary system that facilitates measuring optical fiber channel loss in photonic communication, including communication with a monitor server via an interconnecting device over an electrical channel, in accordance with an embodiment of the present application.

FIG. 6 illustrates an exemplary system 600 that facilitates measuring optical fiber channel loss in photonic communication, including communication with a monitor server via an interconnecting device over an electrical channel, in accordance with an embodiment of the present application. System 600 includes an exchanger device 602 (e.g., any interconnecting device such as a router). Exchange device 602 is connected to monitor server 502 via an electrical channel. Exchanger device 602 is also connected via the electrical channel to communication device 102 and 112, multiplexing devices 104 and 114, and measuring devices 106 and 116. System 600 is depicted as similar to system 100 of FIG. 1, but can also include any of systems 200, 300, and 400 of, respectively, FIGS. 2, 3, and 4 (e.g., where exchanger 602 is also connected to transceiver devices 220 and 230, or to OTDR 302, or to both OTDRs 302 and 402). Legend 604 indicates that a solid line denotes an optical fiber channel, while a dashed line denotes an electrical channel.

When multiplexing devices 104 and 114 are used as time division multiplexing devices, monitor server 502 can send instructions (via exchanger device 602) indicating the working mode of the time division multiplexing to the system, which allows measurement of the transmission loss over the optical fiber channel in a specific time window without influencing the photonic communication. For example, monitor server 502 can send an instruction to suspend photonic communication to communication devices 102 and 112, and can send another instruction to multiplexing devices 104 and 114 via exchanger device 602 to turn on the optical link between multiplexing devices 104 and 114. In the next time window, multiplexing device 104 can couple reference light signal 124 transmitted from measuring device 106, and transmit coupled signal 630 to multiplexing device 114. Multiplexing device 114 can send the received light signal as reference light signal 134 to measuring device 116, which allows measuring device 116 to measure reference light signal 134. Monitor server 502 can obtain the indices (e.g., the measured results) from measuring device 116.

After obtaining the indices, monitor server 502 can send an instruction to multiplexing devices 104 and 114 via exchanger device 602 to turn off the optical link between multiplexing devices 104 and 114, and can send another instruction to resume photonic communication to communication devices 102 and 112. As a result, in the next time window, communication devices 102 and 112 at both ends of the optical fiber channel may resume normal photonic communication, e.g., a quantum key agreement or distribution process.

Systems 500 and 600 illustrate how the monitor server can achieve automatic measurement of the degree of loss of the optical fiber channel without affecting the photonic communication by sending instructions indicating the multiplexing working mode to the system. This allows the system to perform flexible measurements based on varying strategies. The system can perform regular measurements based on a pre-determined time interval, or the system can begin measurement as needed at any time. For example, during the quantum key agreement ("QKA") process, if the QKA fails, the monitor server can send an instruction to begin the measurement for the loss of the optical fiber channel. The QKA may fail if an error rate exceeds a predetermined threshold value or if the number of attempted QKAs in a certain time window exceeds a predetermined threshold value.

In summary, embodiments of the present invention provide a system which facilitates measuring the loss of the optical fiber channel in photonic communication, without affecting the actual photonic communication. The system includes a pair of photonic communication devices coupled to, respectively, a pair of multiplexing devices, which are in turn coupled, respectively, to a pair of measuring devices. A measuring device transmits a reference light signal, which is coupled by a multiplexing device with a photonic signal transmitted by a photonic communication device. The multiplexing device can then transmit the coupled signal to the other multiplexing device. The coupled signal is separated by the other multiplexing device into the reference light signal which is transmitted to the other measuring device. The other measuring device can then obtain the indices related to the degree of loss of the optical fiber channel based on the photonic communication.

More generally, the system provides a transmission channel for the photonic signal and the reference light signal, such that during the photonic communication, the measuring devices can measure the coupled reference light signal at any time as needed, which allows the system to measure and obtain the indices related to the optical fiber channel loss. Thus, embodiments of the present invention achieve real-time measurement of the loss of the optical fiber channel in photonic communication, while maintaining a correct photonic transmission or communication without affecting the photonic communication. The system can thus provide a more accurate and powerful basis for improving the operation of photonic communication, including, e.g., an increase in the coding rate of a quantum key during a quantum key agreement process.

Figure 7A:
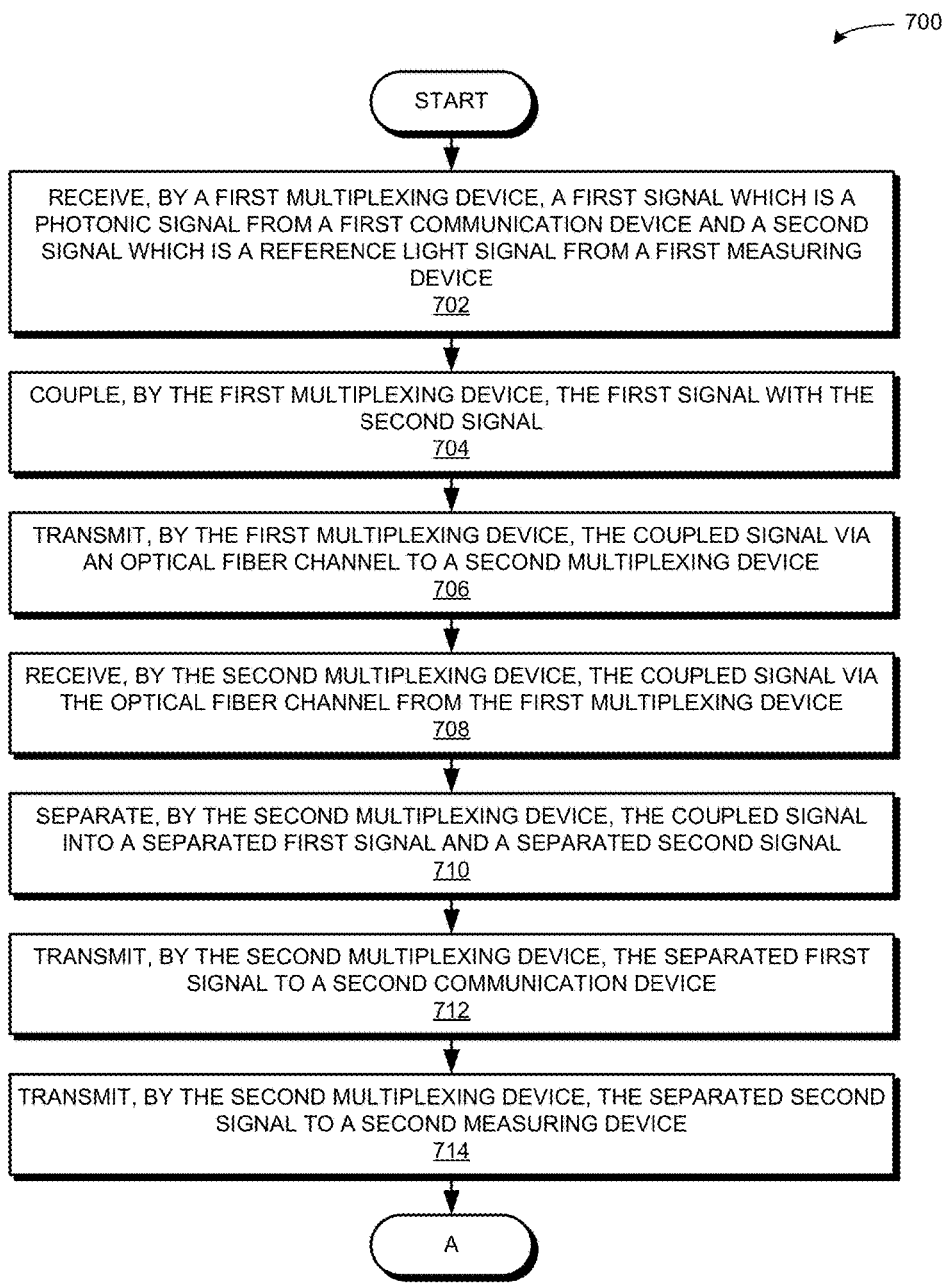
FIG. 7A presents a flowchart illustrating a method that facilitates measuring optical fiber channel loss in photonic communication, in accordance with an embodiment of the present application.

Exemplary Method for Facilitating Measurement of Loss of Photonic Communication FIG. 7A presents a flowchart 700 illustrating a method that facilitates measuring optical fiber channel loss in photonic communication, in accordance with an embodiment of the present application. During operation, a first multiplexing device receives a first signal which is a photonic signal from a first communication device and a second signal which is a reference light signal from a first measuring device (operation 702). The first multiplexing device couples the first signal with the second signal (operation 704). The first multiplexing device transmits the coupled signal via an optical fiber channel to a second multiplexing device (operation 706).

The second multiplexing device receives the coupled signal via the optical fiber channel from the first multiplexing device (operation 708). The second multiplexing device separates the coupled signal into a separated first signal and a separated second signal (operation 710). The second multiplexing device transmits the separated first signal to a second communication device (operation 712), and also transmits the separated second signal to a second measuring device (operation 714). The operation continues as described at Label A of FIG. 7B.

Figure 7B:
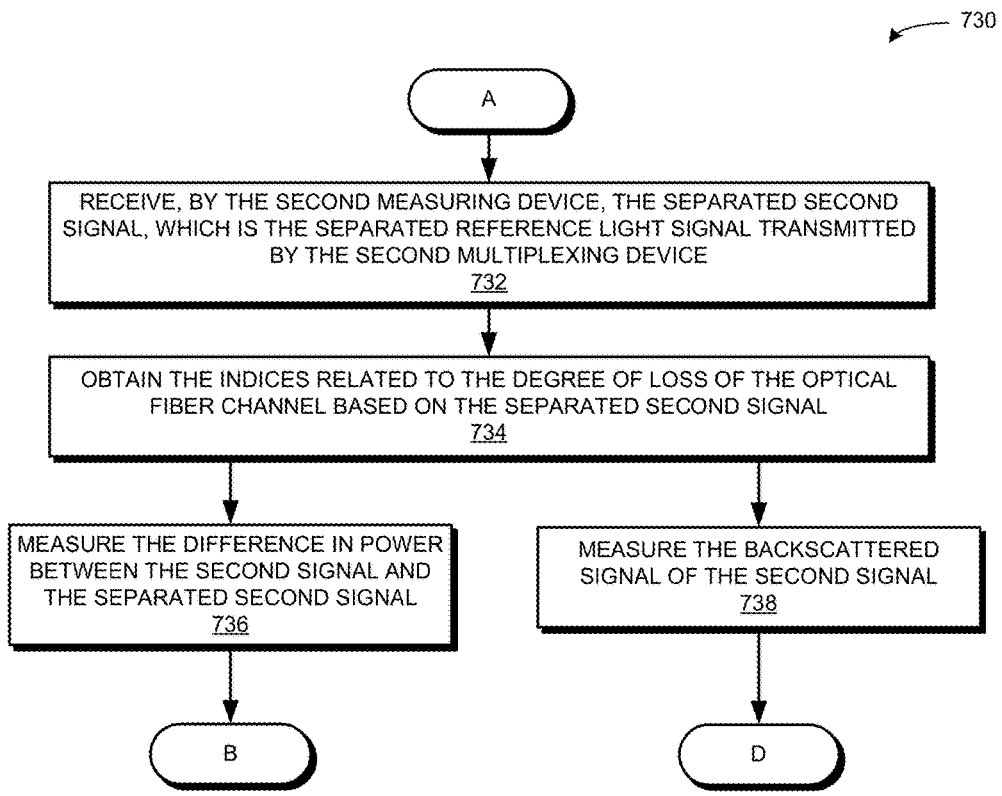
FIG. 7B presents a flowchart illustrating a method that facilitates measuring optical fiber channel loss in photonic communication, including obtaining indices related to the degree of loss, in accordance with an embodiment of the present application.

FIG. 7B presents a flowchart 730 illustrating a method that facilitates measuring optical fiber channel loss in photonic communication, including obtaining indices related to the degree of loss, in accordance with an embodiment of the present application. The second measuring device receives the separated second signal, which is the separated reference light signal transmitted by the second multiplexing device (operation 732). The system obtains the indices related to the degree of loss of the optical fiber channel based on the separated second signal (operation 734). The system can measure the difference in power between the second signal and the separated second signal (operation 736). The operation continues as described at Label B of FIG. 7C.

Figure 7C:
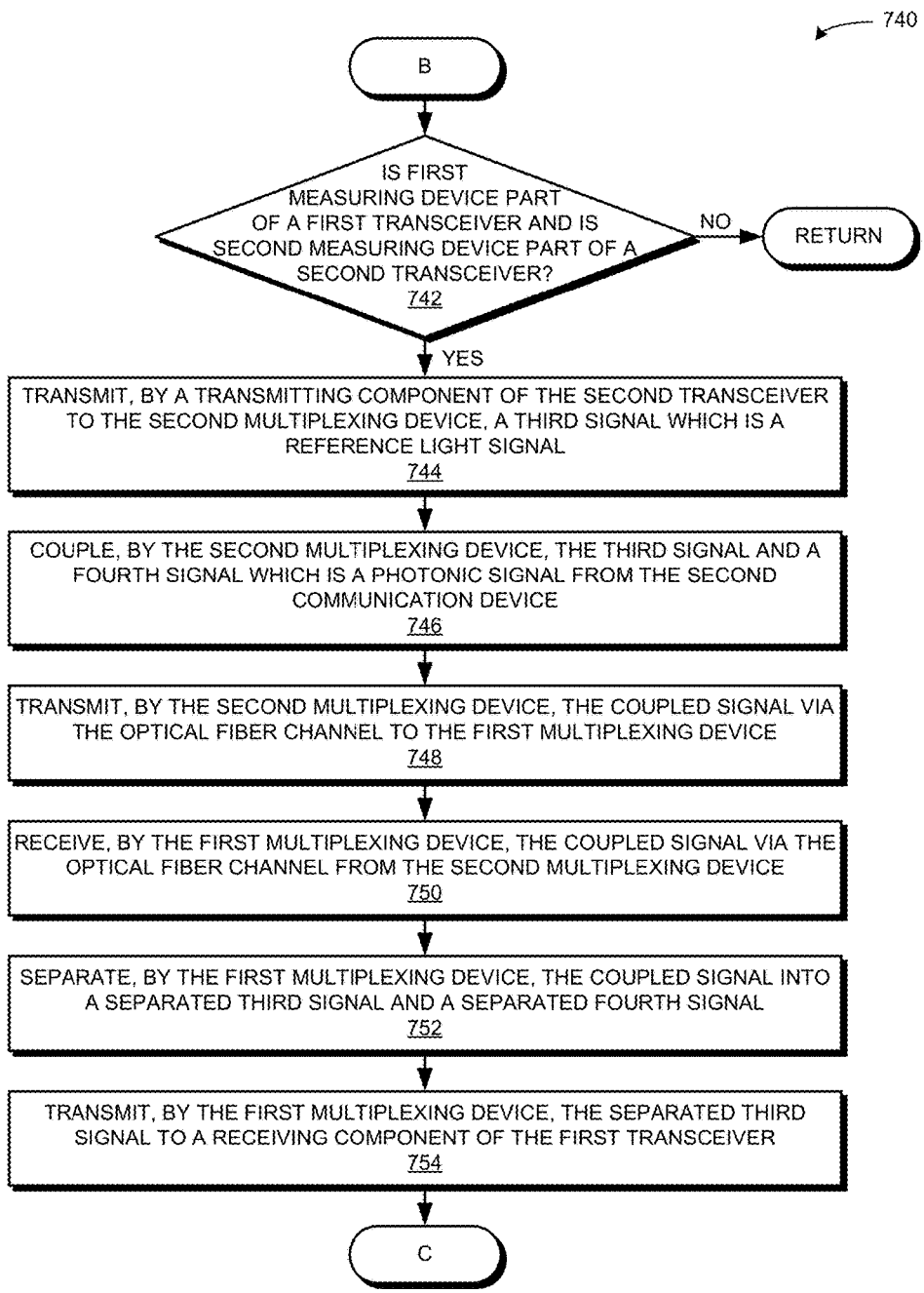
FIG. 7C presents a flowchart illustrating a method that facilitates measuring optical fiber channel loss in photonic communication, including bi-directional measurement of reference light signals, in accordance with an embodiment of the present application.
Figure 7D:
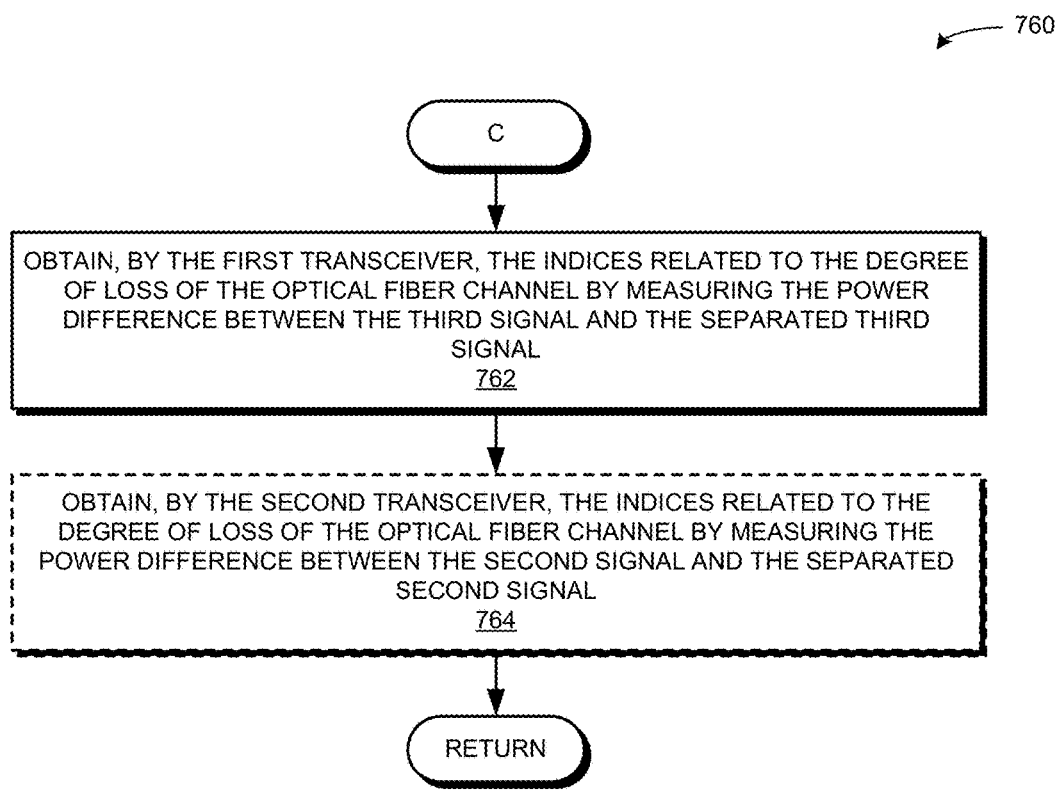
FIG. 7D presents a flowchart illustrating a method that facilitates measuring optical fiber channel loss in photonic communication, including bi-directional measurement of reference light signals, in accordance with an embodiment of the present application.
Figure 7E:
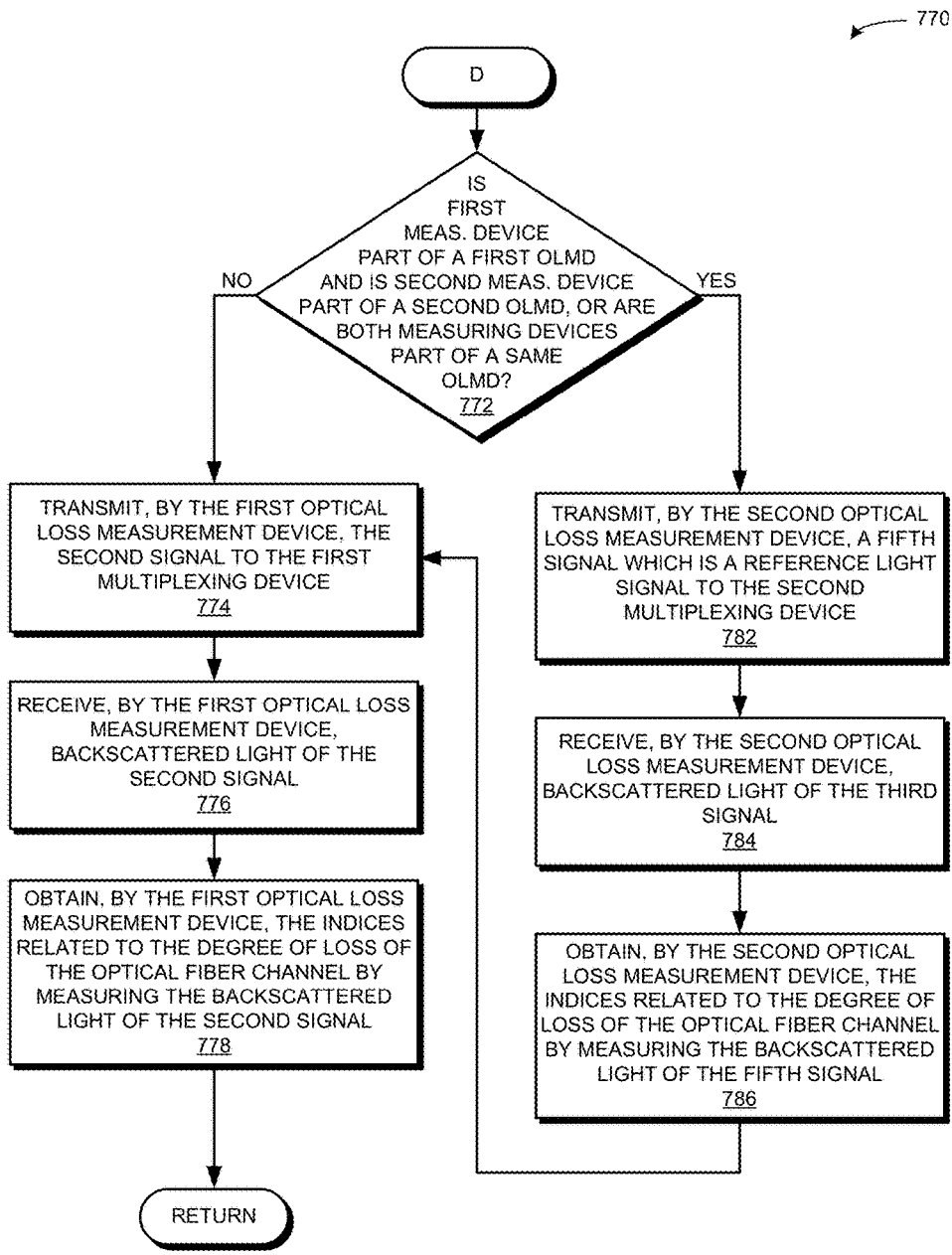
FIG. 7E presents a flowchart illustrating a method that facilitates measuring optical fiber channel loss in photonic communication, including uni-directional and bi-directional measurement of backscattered light by optical loss measurement devices, in accordance with an embodiment of the present application.

The system can also measure the backscattered signal of the second signal (operation 738), and the operation continues as described as Label D or FIG. 7E.

Method for Uni- and Bi-Directional Measurement of Reference Light Signals

FIG. 7C presents a flowchart 740 illustrating a method that facilitates measuring optical fiber channel loss in photonic communication, including bi-directional measurement of reference light signals, in accordance with an embodiment of the present application. The system determines whether the first measuring device is part of a first transceiver and the second measuring device is part of a second transceiver (decision 742). If not (implying uni-directional measurement of the reference light signal only, as in operation 736), the operation returns. If the system includes the first and second transceiver (implying bi-directional measurement of reference light signals), the system transmits, by a transmitting component of the second transceiver to the second multiplexing device, a third signal which is a reference light signal (operation 744). The second multiplexing device couples the third signal and a fourth signal which is a photonic signal from the second communication device (operation 746). The second multiplexing device transmits the coupled signal via the optical fiber channel to the first multiplexing device (operation 748). The first multiplexing device receives the coupled signal via the optical fiber channel from the second multiplexing device (operation 750). The first multiplexing device separates the coupled signal into a separated third signal and a separated fourth signal (operation 752). The first multiplexing device transmits the separated third signal to a receiving component of the first transceiver (operation 754). The first multiplexing device can also transmit the separated fourth signal to the first communication device (not shown). The operation continues as described at Label C of FIG. 7D.

FIG. 7D presents a flowchart 760 illustrating a method that facilitates measuring optical fiber channel loss in photonic communication, including bi-directional measurement of reference light signals, in accordance with an embodiment of the present application. The first transceiver obtains the indices related to the degree of loss of the optical fiber channel by measuring the power difference between the third signal and the separated third signal (operation 762). The system can also obtain, by the second transceiver, the indices related to the degree of loss of the optical fiber channel by measuring the power difference between the second signal and the separated second signal (operation 762, similar to operations 734 and 736 for the uni-directional measurement of the reference light signal).

Method for Measurement of Backscattered Light

FIG. 7E presents a flowchart 770 illustrating a method that facilitates measuring optical fiber channel loss in photonic communication, including uni-directional and bi-directional measurement of backscattered light by optical loss measurement devices, in accordance with an embodiment of the present application. The system determines whether the first measuring device is part of a first optical loss measurement device ("OLMD") and the second measuring device is part of a second OLMD (decision 742). If not (implying uni-directional measurement of the backscattered light of the reference light signal only), the first OLMD transmits the second signal to the first multiplexing device (operation 774). Recall that the second signal is a reference light signal. The first OLMD subsequently receives the backscattered light of the second signal (operation 776), and obtains the indices related to the degree of loss of the optical fiber channel by measuring the backscattered light of the second signal (operation 778). Note that operations similar to operations 704-714 can also occur as part of operations 774-778.

If the system includes the first and second OLMDs (implying bi-directional measurement of the backscattered light of reference light signals), the second OLMD transmits a fifth signal which is a reference light signal to the second multiplexing device (operation 782). The second OLMD receives the backscattered light of the third signal (operation 784), and obtains the indices related to the degree of loss of the optical fiber channel by measuring the backscattered light of the fifth signal (operation 786). The operation then continues as described previously at operation 774, for uni-directional measurement of the backscattered light of the second signal. Note that operations similar to operations 744-754 can also occur as part of operations 782-786.

Figure 8A:
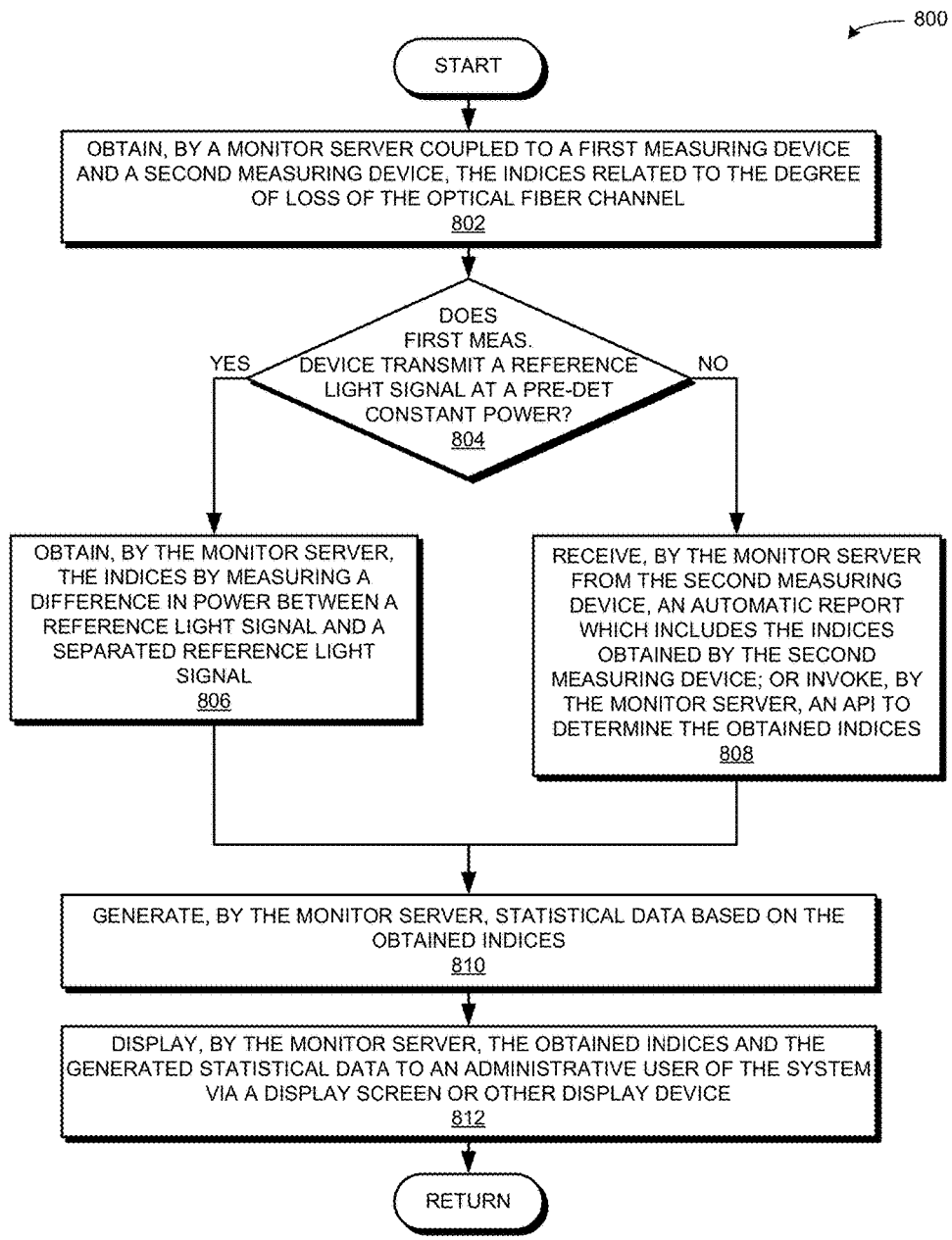
FIG. 8A presents a flowchart illustrating a method that facilitates measuring optical fiber channel loss in photonic communication, including communication with a monitor server over an electrical channel, in accordance with an embodiment of the present application.

Method by Monitor Server for Facilitating Measurement of Loss of Photonic Communication FIG. 8A presents a flowchart 800 illustrating a method that facilitates measuring optical fiber channel loss in photonic communication, including communication with a monitor server over an electrical channel, in accordance with an embodiment of the present application. A monitor server coupled via an electrical channel to a first measuring device and a second measuring device obtains the indices related to the degree of loss of the optical fiber channel (operation 802). The system determines whether the first measuring device transmits a reference light signal at a pre-determined constant power (decision 804). If it does, the monitor server obtains the indices by measuring a difference in power between a reference light signal and a separated reference light signal (operation 806). If it does not, the monitor server receives from the second measuring device, an automatic report which includes the indices obtained by the second measuring device, or, alternatively, the monitor server invokes an application programming interface ("API") to determine the obtained indices (operation 808). The API may be provided by the second measuring device. The monitor server generates statistical data based on the obtained indices (operation 810), and displays the obtained indices and the generated statistical data to an administrative user of the system via a display screen or other display device (operation 812).

Figure 8B:
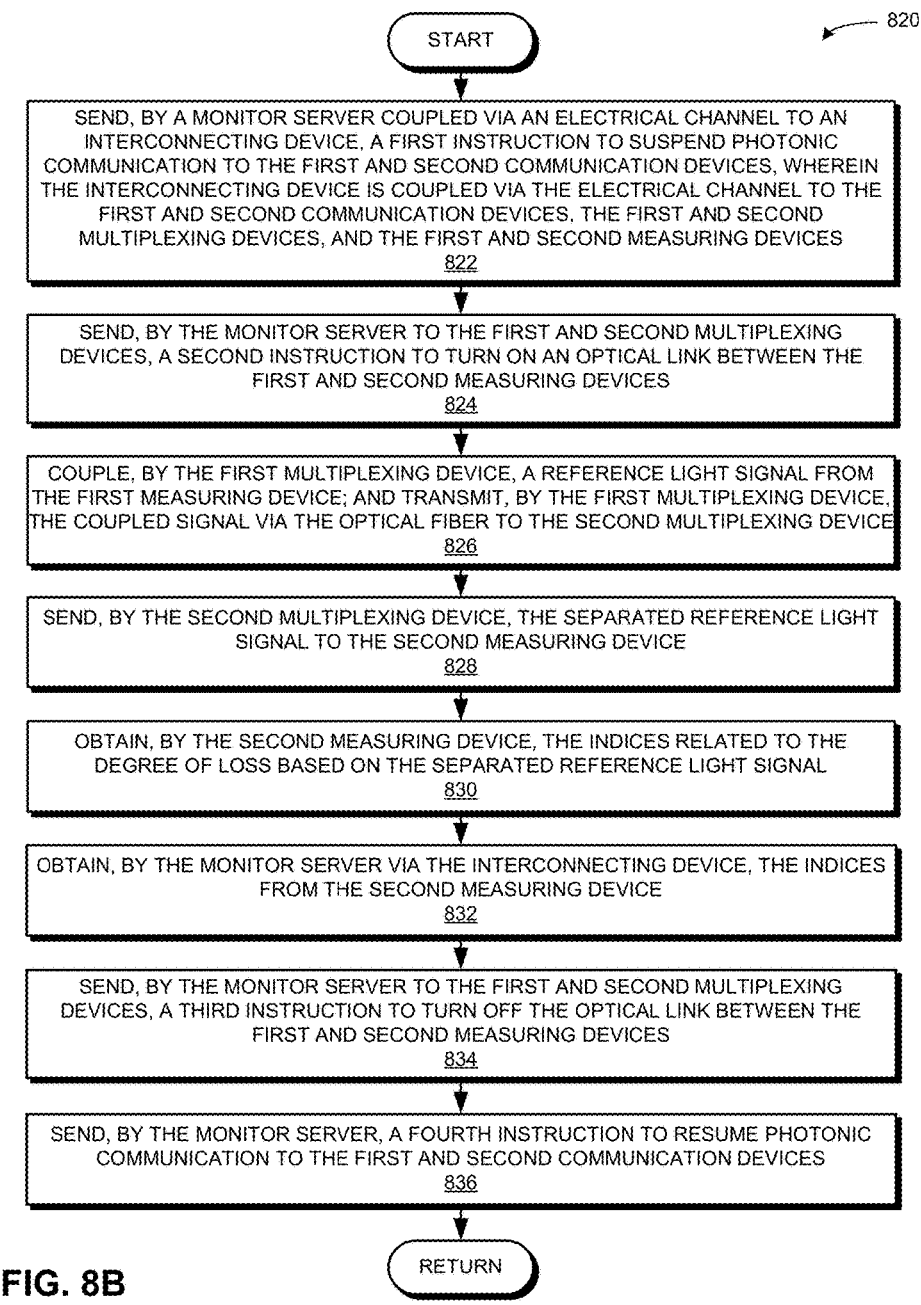
FIG. 8B presents a flowchart illustrating a method that facilitates measuring optical fiber channel loss in photonic communication, including communication with a monitor server via an interconnecting device over an electrical channel, in accordance with an embodiment of the present application.

FIG. 8B presents a flowchart 820 illustrating a method that facilitates measuring optical fiber channel loss in photonic communication, including communication with a monitor server via an interconnecting device over an electrical channel, in accordance with an embodiment of the present application. A monitor server is coupled via an electrical channel to an interconnecting device, which is coupled via the electrical channel to a first and a second communication device, a first and a second multiplexing device, and a first and a second measuring device. The monitor server sends a first instruction to suspend photonic communication to the first and second communication devices (operation 822). The monitor server sends, via the interconnecting device to the first and second multiplexing devices, a second instruction to turn on an optical link between the first and second measuring devices (operation 824). The first multiplexing device couples a reference light signal from the first measuring device (with a quantum light signal), and transmits the coupled signal via an optical fiber channel to the second multiplexing device (operation 826). The second multiplexing device sends the separated reference light signal to the second measuring device (operation 828).

The second measuring device obtains the indices related to the degree of loss of the optical fiber channel based on the separated reference light signal (operation 830). The monitor server obtains, via the interconnecting device, the indices from the second measuring device (operation 832). The monitor server sends, via the interconnecting device to the first and second multiplexing devices, a third instruction to turn off the optical link between the first and second multiplexing devices (operation 834). The monitor server sends a fourth instruction to resume photonic communication to the first and second communication devices (operation 836).

Exemplary Computer System and Device

Figure 9:
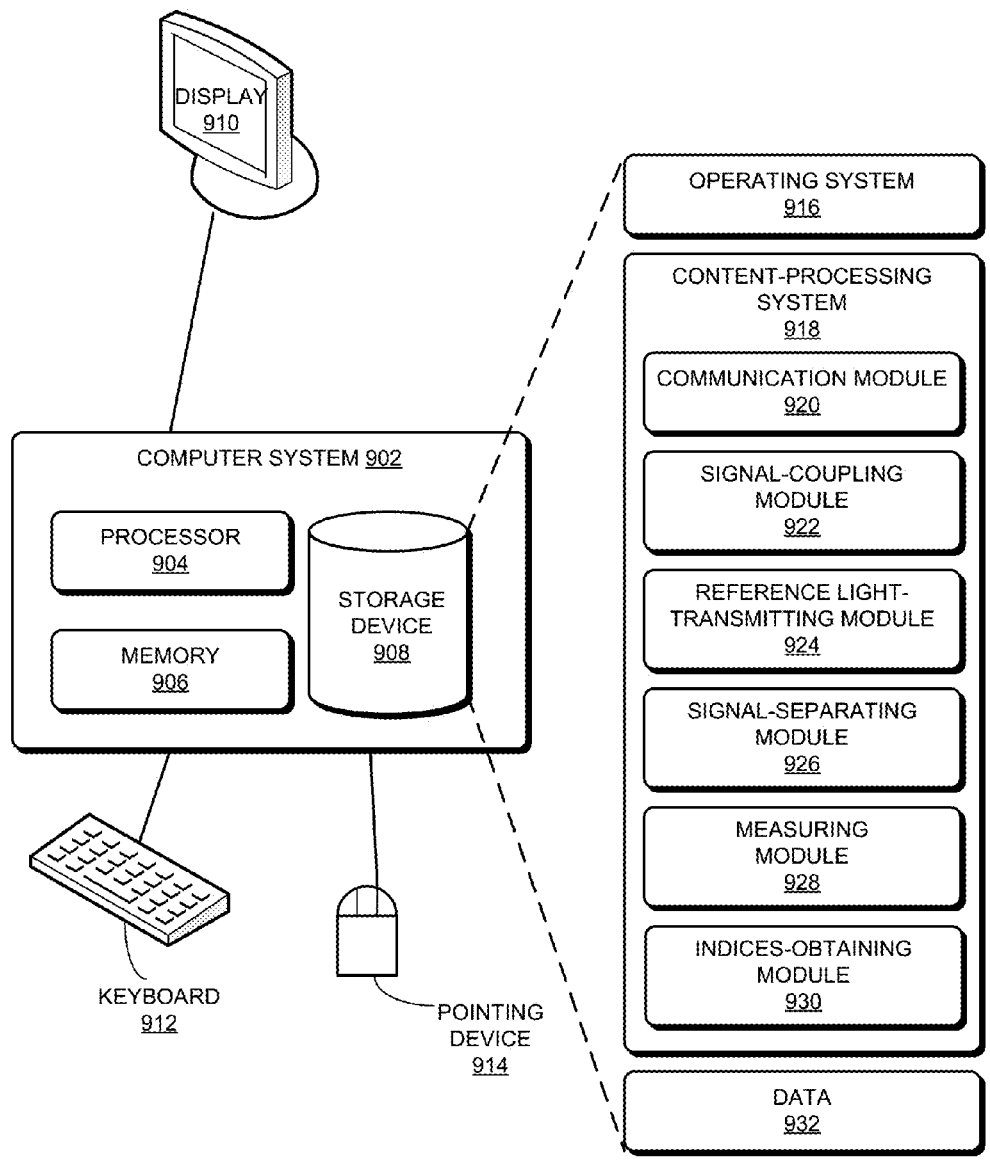
FIG. 9 illustrates an exemplary computer system that facilitates measuring optical fiber channel loss in photonic communication, in accordance with an embodiment of the present application.

FIG. 9 illustrates an exemplary computer system that facilitates measuring optical fiber channel loss in photonic communication, in accordance with an embodiment of the present application. Computer system 902 includes a processor 904, a memory 906, and a storage device 908. Memory 906 can include a volatile memory (e.g., RAM) that serves as a managed memory, and can be used to store one or more memory pools. Furthermore, computer system 902 can be coupled to a display device 910, a keyboard 912, and a pointing device 914. Storage device 908 can store an operating system 916, a content-processing system 918, and data 932.

Content-processing system 918 can include instructions, which when executed by computer system 902, can cause computer system 902 to perform methods and/or processes described in this disclosure. Specifically, content-processing system 918 can include: a communication module 920 for transmitting and receiving quantum light signals and reference light signals; a signal-coupling module 922 for coupling a quantum light signal and a reference light signal; a reference light-transmitting module 924 for transmitting a reference signal light from, e.g., a measuring device, a transceiver, or an OLMD; a signal-separating module 926 for separating a coupled signal into a quantum light signal and a reference light signal; a measuring module 928 for measuring a power difference between a transmitted and received reference light signal, or for measuring backscattered light of a reference signal light; and an indices-obtaining module 930 for obtaining the indices related to the degree of loss of the optical fiber channel.

Data 932 can include any data that is required as input or that is generated as output by the methods and/or processes described in this disclosure. Specifically, data 932 can store at least: an indicator or a power of a transmitted, received, or separated received quantum light signal or a reference light signal; one or more indices related to a degree of loss of an optical fiber channel; an indicator of an optical fiber channel or an electrical channel; an indicator or identifier of a communication device, a transceiver, a multiplexing device, a measuring device, an optical loss measurement device, or an optical time domain reflectometer; a measure of a backscattered signal of a reference light signal; a dimension or unit of time; a wavelength; a report which includes indices; an application programming interface; and statistical data based on indices.

Figure 10:
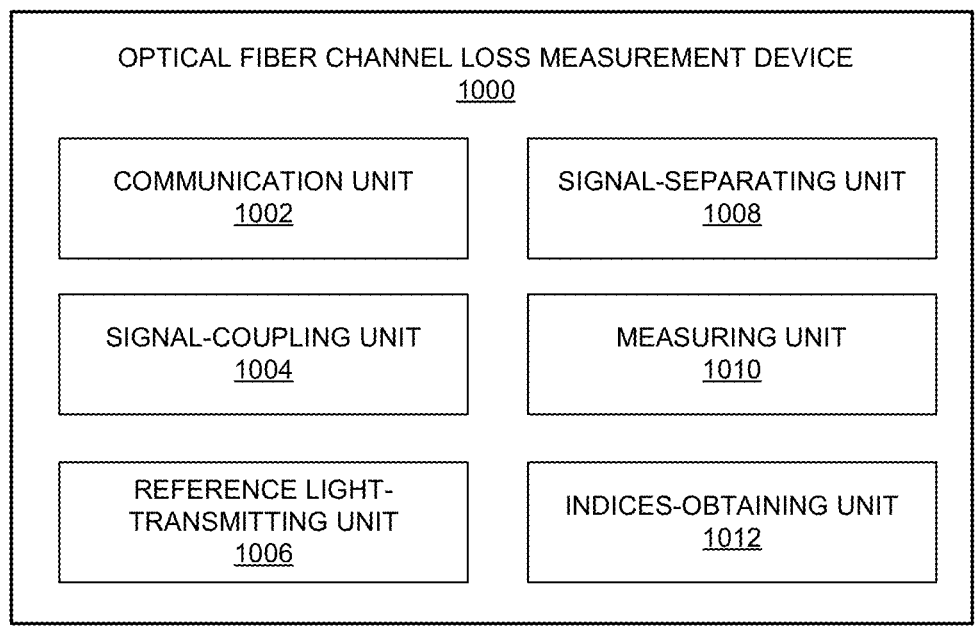
FIG. 10 illustrates an exemplary device that facilitates measuring optical fiber channel loss in photonic communication, in accordance with an embodiment of the present application.

FIG. 10 illustrates an exemplary device 1000 that facilitates measuring optical fiber channel loss in photonic communication, in accordance with an embodiment of the present application. Device 1000 can comprise a plurality of units or apparatuses which may communicate with one another via a wired, wireless, quantum light, or electrical communication channel. Device 1000 may be realized using one or more integrated circuits, and may include fewer or more units or apparatuses than those shown in FIG. 10. Further, device 1000 may be integrated in a computer system, or realized as a separate device which is capable of communicating with other computer systems and/or devices. Specifically, device 1000 can comprise units 1002-1012 which perform functions or operations similar to modules 920-930 of computer system 902 of FIG. 9, including: a communication unit 1000; a signal-coupling unit 1004; a reference light-transmitting unit 1006; a signal-separating unit 1008; a measuring unit 1010; and an indices-obtaining unit 1012.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for measuring optical fiber channel loss in photonic communication during a quantum key distribution process, the method comprising:
   in response to receiving, by a first multiplexing device, a first signal and a second signal, wherein the first signal is a photonic signal which includes isolated photons, and wherein the second signal is a reference light signal transmitted by a first measuring device, coupling, by the first multiplexing device, the first signal with the second signal;
   transmitting, by the first multiplexing device, the coupled signal via the optical fiber channel to a second multiplexing device;
   separating, by the second multiplexing device, the coupled signal into a separated first signal and a separated second signal;
   transmitting, by the second multiplexing device, the separated second signal to a second measuring device; and
   obtaining, by the second measuring device, indices related to a degree of loss of the optical fiber channel by calculating a difference in power between the second signal and the separated second signal,
   thereby improving the operation of the quantum key distribution process.

2. The method of claim 1, wherein the first signal is transmitted by a first communication device, the first communication device and a second communication device comprise equipment for photonic communication, the first multiplexing device is coupled to the first communication device and the first measuring device via the optical fiber channel, and the second multiplexing device is coupled to the second communication device and the second measuring device via the optical fiber channel,
   wherein the method further comprises:
   receiving, by the second measuring device, the separated second signal from the second multiplexing device; and
   transmitting, by the second multiplexing device, the separated first signal to the second communication device.

3. The method of claim 2, wherein the first and second multiplexing devices transmit the second signal through mutual isolation from a coupled photonic signal based on one or more of:
   a dimension or unit of time; and
   a wavelength.

4. The method of claim 2, wherein the first measuring device comprises a first transceiver with a transmitting component and a receiving component, and the second measuring device comprises a second transceiver with a transmitting component and a receiving component.

5. The method of claim 4, wherein obtaining the indices further comprises one or more of:
   measuring, by the first transceiver, a difference in power between the second signal and the separated second signal; and
   performing a bi-directional measurement of reference light signals, which involves:
      measuring, by the first transceiver, a difference in power between the second signal and the separated second signal;
      in response to receiving, by the second multiplexing device, a third signal which is a reference light signal from the transmitting component of the second transceiver and a fourth signal which is a photonic signal from the second communication device, coupling, by the second multiplexing device, the third signal with the fourth signal to obtain a newly coupled signal;
      transmitting, by the second multiplexing device, the newly coupled signal via the optical fiber channel to the first multiplexing device;
      separating, by the first multiplexing device, the newly coupled signal into a separated third signal and a separated fourth signal;
      transmitting, by the first multiplexing device, the separated third signal to the receiving component of the first transceiver;
      transmitting, by the first multiplexing device, the separated fourth signal to the first communication device; and
      obtaining, by the first transceiver, the indices related to the degree of loss of the optical fiber channel based on the separated third signal by measuring, by the first transceiver, a difference in power between the third signal and the separated third signal.

6. The method of claim 2, wherein the first measuring device comprises a first optical loss measurement device, wherein the first optical loss measurement device transmits the second signal to the first multiplexing device, and wherein obtaining the indices further comprises:
   receiving, by the first optical loss measurement device, a backscattered light of the second signal; and
   obtaining, by the first optical loss measurement device, the indices related to the degree of loss of the optical fiber channel by measuring, by the first optical loss measurement device, the backscattered light of the second signal.

7. The method of claim 6, wherein the second measuring device comprises a second optical loss measurement device, and wherein obtaining the indices further comprises:
   performing a bi-directional measurement of backscattered light, which involves:
      transmitting, by the second optical loss measurement device, a third signal which is a reference light signal from the second optical loss measurement device;
      receiving, by the second optical loss measurement device, backscattered light of the third signal; and
      obtaining, by the second optical loss measurement device, the indices related to the degree of loss of the optical fiber channel by measuring, by the second optical loss measurement device, the backscattered light of the third signal.

8. The method of claim 2, wherein a monitor server is coupled to the first and second measuring devices via an electrical channel, wherein the method further comprises:
in response to determining that the first measuring device transmits the second signal at a pre-determined constant power, obtaining, by the monitor server, the indices by measuring a difference in power between the second signal and the separated second signal;
in response to determining that the first measuring device does not transmit the second signal at a pre-determined constant power:
receiving, by the monitor server from the second measuring device, an automatic report which includes the indices obtained by the second measuring device; or
invoking, by the monitor server, an application programming interface to determine the obtained indices;
generating, by the monitor server, statistical data based on the obtained indices; and
displaying, by the monitor server, the obtained indices and the generated statistical data to an administrative user of the system via a display screen or other display device.

9. The method of claim 2, wherein a monitor server is coupled via an electrical channel to an interconnecting device, wherein the interconnecting device is coupled via the electrical channel to the first and second communication devices, the first and second multiplexing devices, and the first and second measuring devices, and wherein the method further comprises:
sending, by the monitor server, a first instruction to suspend photonic communication to the first and second communication devices;
sending, by the monitor server to the first and second multiplexing devices via the interconnecting device, a second instruction to turn on an optical link between the first and second measuring devices;
obtaining, by the second measuring device, the indices related to the degree of loss of the optical fiber channel based on the separated second signal;
obtaining, by the monitor server via the interconnecting device, the indices from the second measuring device;
sending, by the monitor server to the first and second multiplexing devices via the interconnecting device, a third instruction to turn off the optical link between the first and second measuring devices; and
sending, by the monitor server, a fourth instruction to resume photonic communication to the first and second communication devices.

10. A computer system for measuring optical fiber channel loss in photonic communication during a quantum key distribution process, the system comprising:
a processor; and
a memory coupled to the processor and storing instructions, which when executed by the processor cause the processor to perform a method, the method comprising:
in response to receiving, by a first multiplexing device, a first signal and a second signal, wherein the first signal is a photonic signal which includes isolated photons, and wherein the second signal is a reference light signal transmitted by a first measuring device, coupling, by the first multiplexing device, the first signal with the second signal;
transmitting, by the first multiplexing device, the coupled signal via the optical fiber channel to a second multiplexing device;
separating, by the second multiplexing device, the coupled signal into a separated first signal and a separated second signal;
transmitting, by the second multiplexing device, the separated second signal to a second measuring device; and
obtaining, by the second measuring device, indices related to a degree of loss of the optical fiber channel by calculating a difference in power between the second signal and the separated second signal,
thereby improving the operation of the quantum key distribution process.

11. The computer system of claim 10, wherein the first signal is transmitted by a first communication device, the first communication device and a second communication device comprise equipment for photonic communication, the first multiplexing device is coupled to the first communication device and the first measuring device via the optical fiber channel, and the second multiplexing device is coupled to the second communication device and the second measuring device via the optical fiber channel,
wherein the method further comprises:
receiving, by the second measuring device, the separated second signal from the second multiplexing device; and
transmitting, by the second multiplexing device, the separated first signal to the second communication device.

12. The computer system of claim 11, wherein the first and second multiplexing devices transmit the second signal through mutual isolation from a coupled photonic signal based on one or more of:
a dimension or unit of time; and
a wavelength.

13. The computer system of claim 11, wherein the first measuring device comprises a first transceiver with a transmitting component and a receiving component, and the second measuring device comprises a second transceiver with a transmitting component and a receiving component.

14. The computer system of claim 13, wherein obtaining the indices further comprises one or more of:
measuring, by the first transceiver, a difference in power between the second signal and the separated second signal; and
performing a bi-directional measurement of reference light signals, which involves:
measuring, by the first transceiver, a difference in power between the second signal and the separated second signal;
in response to receiving, by the second multiplexing device, a third signal which is a reference light signal from the transmitting component of the second transceiver and a fourth signal which is a photonic signal from the second communication device, coupling, by the second multiplexing device, the third signal with the fourth signal to obtain a newly coupled signal;
transmitting, by the second multiplexing device, the newly coupled signal via the optical fiber channel to the first multiplexing device;
separating, by the first multiplexing device, the newly coupled signal into a separated third signal and a separated fourth signal;
transmitting, by the first multiplexing device, the separated third signal to the receiving component of the first transceiver;

transmitting, by the first multiplexing device, the separated fourth signal to the first communication device; and obtaining, by the first transceiver, the indices related to the degree of loss of the optical fiber channel based on the separated third signal by measuring, by the first transceiver, a difference in power between the third signal and the separated third signal.

15. The computer system of claim 11, wherein the first measuring device comprises a first optical loss measurement device, wherein the first optical loss measurement device transmits the second signal to the first multiplexing device, and wherein obtaining the indices further comprises:

receiving, by the first optical loss measurement device, a backscattered light of the second signal; and obtaining, by the first optical loss measurement device, the indices related to the degree of loss of the optical fiber channel by measuring, by the first optical loss measurement device, the backscattered light of the second signal.

16. The computer system of claim 15, wherein the second measuring device comprises a second optical loss measurement device, and wherein obtaining the indices further comprises:

performing a bi-directional measurement of backscattered light, which involves:

transmitting, by the second optical loss measurement device, a third signal which is a reference light signal from the second optical loss measurement device;

receiving, by the second optical loss measurement device, backscattered light of the third signal; and obtaining, by the second optical loss measurement device, the indices related to the degree of loss of the optical fiber channel by measuring, by the second optical loss measurement device, the backscattered light of the third signal.

17. The computer system of claim 11, wherein a monitor server is coupled to the first and second measuring devices via an electrical channel, wherein the method further comprises:

in response to determining that the first measuring device transmits the second signal at a pre-determined constant power, obtaining, by the monitor server, the indices by measuring a difference in power between the second signal and the separated second signal;

in response to determining that the first measuring device does not transmit the second signal at a pre-determined constant power:

receiving, by the monitor server from the second measuring device, an automatic report which includes the indices obtained by the second measuring device; or invoking, by the monitor server, an application programming interface to determine the obtained indices;

generating, by the monitor server, statistical data based on the obtained indices; and displaying, by the monitor server, the obtained indices and the generated statistical data to an administrative user of the system via a display screen or other display device.

18. The computer system of claim 11, wherein a monitor server is coupled via an electrical channel to an interconnecting device, wherein the interconnecting device is coupled via the electrical channel to the first and second communication devices, the first and second multiplexing devices, and the first and second measuring devices, and wherein the method further comprises:

sending, by the monitor server, a first instruction to suspend photonic communication to the first and second communication devices;

sending, by the monitor server to the first and second multiplexing devices via the interconnecting device, a second instruction to turn on an optical link between the first and second measuring devices;

obtaining, by the second measuring device, the indices related to the degree of loss of the optical fiber channel based on the separated second signal;

obtaining, by the monitor server via the interconnecting device, the indices from the second measuring device;

sending, by the monitor server to the first and second multiplexing devices via the interconnecting device, a third instruction to turn off the optical link between the first and second measuring devices; and sending, by the monitor server, a fourth instruction to resume photonic communication to the first and second communication devices.

19. A non-transitory computer-readable storage medium storing instructions that when executed by a computer cause the computer to perform a method for measuring optical fiber channel loss in photonic communication during a quantum key distribution process, the method comprising:

in response to receiving, by a first multiplexing device, a first signal and a second signal, wherein the first signal is a photonic signal which includes isolated photons, and wherein the second signal is a reference light signal transmitted by a first measuring device, coupling, by the first multiplexing device, the first signal with the second signal;

transmitting, by the first multiplexing device, the coupled signal via the optical fiber channel to a second multiplexing device;

separating, by the second multiplexing device, the coupled signal into a separated first signal and a separated second signal;

transmitting, by the second multiplexing device, the separated second signal to a second measuring device; and obtaining indices related to a degree of loss of the optical fiber channel by calculating a difference in power between the second signal and the separated second signal, thereby improving the operation of the quantum key distribution process.

20. The storage medium of claim 19, wherein obtaining, by the second measuring device, the indices related to the degree of loss of the optical fiber channel further comprises:

measuring, by the second measuring device, backscattered light of the second signal.

* * * * *